(12) United States Patent
Clare et al.

(10) Patent No.: US 11,087,383 B1
(45) Date of Patent: Aug. 10, 2021

(54) METHOD FOR A CENTRALIZED CUSTOMER ORDER PROCESSING SYSTEM WITH AUTOMATIC DETECTION OF CUSTOMER ARRIVAL

(71) Applicant: DD IP Holder LLC, Canton, MA (US)

(72) Inventors: John L. Clare, Westwood, MA (US); Santhosh Kumar Gopinath, Lakeville, MA (US); Praneeth Reddy Veerepalli, Natick, MA (US)

(73) Assignee: DD IP HOLDER LLC, Canton, MA (US)

(*) Notice: Subject to any disclaimer, the term of this patent is extended or adjusted under 35 U.S.C. 154(b) by 190 days.

(21) Appl. No.: 16/059,972

(22) Filed: Aug. 9, 2018

Related U.S. Application Data

(63) Continuation of application No. 14/054,412, filed on Oct. 15, 2013, now Pat. No. 10,078,861.

(51) Int. Cl.
*G06Q 30/00* (2012.01)
*G06Q 30/06* (2012.01)

(52) U.S. Cl.
CPC ..... *G06Q 30/0635* (2013.01); *G06Q 30/0601* (2013.01)

(58) Field of Classification Search
CPC .................. G06Q 30/0635; G06Q 30/0639
See application file for complete search history.

(56) References Cited

U.S. PATENT DOCUMENTS

| 7,426,197 | B2 | 9/2008 | Schotten et al. |
| 7,640,214 | B2 | 12/2009 | Black et al. |
| 7,974,873 | B2 | 7/2011 | Simmons et al. |
| 8,135,624 | B1 | 3/2012 | Ramalingam et al. |
| 8,232,873 | B2 | 7/2012 | Sturm |

(Continued)

FOREIGN PATENT DOCUMENTS

| WO | WO2001063956 A1 | 8/2001 |
| WO | WO2010051119 A2 | 5/2010 |

(Continued)

OTHER PUBLICATIONS

Delivery.com; Delivery.com Expands Presence in San Francisco, Jun. 23, 2012, NewsRx, p. 355 (Year: 2012).*

(Continued)

*Primary Examiner* — Brittney N Miller
(74) *Attorney, Agent, or Firm* — Middleton Reutlinger

(57) ABSTRACT

Methods and apparatus are disclosed for providing a centralized customer order processing system. A customer order entry may be received by a central server. The customer order entry may be routed to a local store server at an identified store location. Upon arrival at the identified store location, a mobile device of the customer may detect a proximity signal located at the identified store location, and a mobile application may be invoked on the mobile device. An order activation signal may be transmitted to a server, the order activation signal indicating customer arrival at the identified store location. The customer order entry may be activated at the local store server. The customer may arrive at the identified store location and pick up their order. Methods and apparatus are also disclosed for implementing the centralized customer order processing system on a mobile device.

22 Claims, 10 Drawing Sheets

(56) References Cited

U.S. PATENT DOCUMENTS

| | | |
|---|---|---|
| 8,249,934 B2 | 8/2012 | Agarwal et al. |
| 8,260,320 B2 | 9/2012 | Herz |
| 2003/0100315 A1 | 5/2003 | Rankin |
| 2003/0208409 A1 | 11/2003 | Mault |
| 2003/0220114 A1 | 11/2003 | Langensteiner et al. |
| 2004/0093274 A1 | 5/2004 | Vanska et al. |
| 2004/0203379 A1 | 10/2004 | Witkowski et al. |
| 2007/0007331 A1 | 1/2007 | Jasper et al. |
| 2007/0088624 A1 | 4/2007 | Vaughn et al. |
| 2007/0205278 A1* | 9/2007 | Lovett .................... G06Q 30/06 235/383 |
| 2010/0312385 A1 | 12/2010 | Deuber |
| 2010/0324977 A1 | 12/2010 | Dragt |
| 2011/0238474 A1 | 9/2011 | Carr et al. |
| 2011/0258058 A1 | 10/2011 | Carroll et al. |
| 2011/0270662 A1 | 11/2011 | Rocco |
| 2011/0270712 A1 | 11/2011 | Wood et al. |
| 2012/0059729 A1 | 3/2012 | Roa et al. |
| 2012/0072311 A1 | 3/2012 | Khan |
| 2012/0158934 A1 | 6/2012 | Xiao et al. |
| 2012/0209657 A1 | 8/2012 | Connolly |
| 2012/0209730 A1 | 8/2012 | Garett |
| 2012/0316938 A1 | 12/2012 | Moshfeghi |
| 2013/0024203 A1 | 1/2013 | Flores et al. |
| 2013/0024299 A1 | 1/2013 | Wong et al. |
| 2013/0138515 A1 | 5/2013 | Taniguchi et al. |
| 2013/0151380 A1 | 6/2013 | Holt |
| 2013/0317921 A1* | 11/2013 | Havas ................. G06Q 20/405 705/15 |
| 2014/0257877 A1* | 9/2014 | L'Heureux ............ G06Q 50/12 705/5 |
| 2014/0279081 A1* | 9/2014 | Marx ..................... G06Q 50/12 705/15 |
| 2016/0088443 A1* | 3/2016 | Kostka .................... H04W 4/30 455/411 |

FOREIGN PATENT DOCUMENTS

| | | |
|---|---|---|
| WO | WO2012120189 A1 | 9/2012 |
| WO | WO2012120302 A1 | 9/2012 |

OTHER PUBLICATIONS

Video: Krystal Resturants Digital Signage, https://scala.com/krystal-restaurants-digital-signage/. Oct. 17, 2012.

Keegan, et al. Easishop: Ambient Intelligence Assits Everyday, Journal Information Sciences. pp. 588-611, vol. 178, Issue 3. Feb. 1, 2008.

Gavalas, et al. Mobile Recommender Systems in TOurism, Journal of Network and Computer APplications. www2.aegean.gr/dgavalas/en/iframe_files/papers/2013/JNCA_accepted_manuscript.pdf. Retrieved Oct. 10, 2013.

Klabjan, et al. In-Store One-to-One Marketing, Journal of Retailing and Consumer Services. 2010.

Woerndl. A Hybrid Recommender System for Context-Aware Recommendations of Mobile Applications, Data Engineering Workshop, 2007 IEEE 23rd International Conference on Data Engineering. Apr. 17, 2007.

\* cited by examiner

METHOD FOR A CENTRALIZED CUSTOMER ORDER PROCESSING SYSTEM WITH AUTOMATIC DETECTION OF CUSTOMER ARRIVAL

BACKGROUND

This specification is directed generally to providing a centralized customer order processing system with automatic detection of customer arrival at an order pick-up location, and more particularly, to providing a centralized customer order processing system based on determining proximity to an order pick-up location.

SUMMARY

A customer may submit a customer order online and proceed to a store for order pick-up. The customer order may be activated when the customer is proximate to the store. For example, a pre-ordered item may be activated based on proximity of the customer to the store's drive-through location.

For example, a customer may place an order for food and/or other items. The customer may select a store location for pick-up of the order. Generally, the store location may not know of the customer's arrival near the store location. In some instances, the customer may place the order near the vicinity of the store location by utilizing a Wi-Fi network, a near-field communication device, and/or a local area network that allows the customer to communicate directly with a store server via, for example, a mobile application on the customer's computing device. In some instances, the customer may place the order from a remote location and, upon arrival at the store, interactively communicate with a store server and/or a back-end server to activate the order. For food and/or other items, the time interval from activation of an order to delivery of the order is critical to maintaining quality of the food and/or other items, and for ensuring customer satisfaction. For example, coffee may be too hot, too cold, and/or it may lose its flavor depending on the time interval from activation of an order to delivery of the order.

In many instances, the determination of the time from activation of an order to its delivery may be achieved by a local store server via the store's intranet. Additionally, and/or alternatively, a queue position for the customer may be determined based upon detection of proximity of the computing device of the customer to the store. In some instances, a customer's estimated time of arrival may be determined. In general, the customer may interactively communicate over the store's local communication network to process one or more aspects of the order (e.g., placing an order, processing payment, and so forth). However, such solutions may present several disadvantages. For example, the store's local communication network may be saddled with the task of handling network traffic related to processing one or more aspects of the customer order. As another example, the local store server may have to be equipped with the ability to handle one or more aspects of the customer order. Also, for example, the two-way communication between the local store server and the customer may decrease efficiency during peak hours, leading to delays in order processing, and/or errors in order processing. As another example, the local devices utilized to detect queue position and/or proximity of the computing device of the customer may be required to be configured to handle such additional two-way data exchange. Also, for example, a mobile device in the vicinity of such a local device may be required to perform additional tasks, including one or more of pairing with the local device, and maintaining secure protocols with the local device. Such tasks may lead to substantial energy consumption for the mobile device. As another example, sensitive customer data may be unnecessarily distributed to, and/or processed at the local store servers.

As discussed herein, the time interval from activation of an order to delivery of the order is critical to the quality of customer service delivery and/or customer satisfaction. Since the store location is in the best position to determine order processing times, the customer may be less likely to be able to determine the optimal time between activation of an order and delivery of the order. Accordingly, it is desirable to have systems and methods to automatically detect proximity of the computing device of the customer to a store location, and trigger activation of the customer order based on detection of such proximity. Also, as disclosed herein, the automatic detection of proximity has the advantage of providing a hands-free drive-through experience for the customer.

Also, as discussed herein, to decrease the network traffic at the local store server and reduce delays and/or errors in order processing, it is desirable for a remote server (e.g., a central order processing server) to manage one or more aspects of the customer order, and let the local store server manage aspects of the customer order from activation of the order until its delivery. Also, as discussed herein, to increase network efficiency during peak hours, leading to efficiency in order processing, and/or reduction of errors in order processing, it is desirable to minimize the need for the customer mobile devices to be in two-way communication with the store's local area network. Additionally, as discussed herein, it is desirable to minimize a wide distribution, handling and/or storage of one or more aspects of sensitive customer data (e.g., residential address, mobile phone number, order preferences) on multiple local store servers. Accordingly, it is desirable to have systems and methods for a centralized customer order processing.

The present disclosure is directed to methods and apparatus for providing a centralized customer order processing system. An electronic customer order entry may be received by a central server. The customer order entry may be routed to a local server at an identified store location (e.g., a store location selected by the customer). Upon arrival at the store location, a mobile device of the customer may detect a proximity signal located at the store location. When the mobile device is within a threshold distance of the proximity device, a mobile application may be invoked on the mobile device. In some implementations the threshold distance may be a predetermined threshold distance. The mobile device, and/or the mobile application on the mobile device may transmit an order activation signal. The order activation signal may be indicative of customer arrival at the store location. The local store server at the store location may be prompted to activate the customer order entry. The customer may then drive up to the drive-through window and pick up the order. Methods and apparatus are also disclosed for identifying a store location of a plurality of store locations based on detecting proximity of the computing device of a customer to the store location, and routing the customer order entry to the identified store location.

As discussed herein, the disclosed methods and apparatus may provide a hands-free drive-through experience for the customer. For example, a customer may submit a customer order to a central server. In some implementations, the customer order may include a selected store location. Additionally, in some implementations, the customer may prepay for the customer order. For example, the customer order may include payment confirmation. The customer order may be routed to a local store server at the selected store location. The customer may then drive to the selected store location for order pick-up. One or more background processes on the mobile device of the customer may detect a proximity signal transmitted by a proximity device at the selected store location. The mobile device of the customer may invoke a mobile application and transmit an order activation signal. The customer order may be activated at the local store server at the selected store location for further processing. The customer may drive up to the drive-through window and pick up the customer order.

In some implementations a computer implemented method may be provided that includes the steps of: receiving, at a central server, a customer order entry, the customer order entry including a customer identifier identifying a customer record, and an electronic customer order including a predefined selection of at least one menu option from a plurality of menu options; identifying, via the central server, a store indicator indicative of a store location; routing the customer order entry from the central server to a store server at the identified store location; receiving an order activation signal, the order activation signal indicative of proximity of a computing device of a customer to a proximity device located at the identified store location, wherein the order activation signal identifies the customer order entry; and activating, upon receipt of the order activation signal, the customer order entry at the store server.

This method and other implementations of the technology disclosed can each optionally include one or more of the following features.

In some implementations receiving the order activation signal may occur when the computing device of the customer determines proximity of the computing device within a threshold distance of the proximity device.

In some implementations the proximity device may be proximate to an order selection board at the identified store location.

In some implementations the proximity device may be a low energy transmission device.

In some implementations the plurality of menu options may be based on a log of past menu selections of the customer, where the past menu selections may be stored in at least one database.

The method may further comprise receiving payment information for the electronic customer order. In some implementations the payment information may be included in the customer order entry. In some implementations the payment information may be retrieved from at least one database based on a log of past payment information for the electronic customer order.

The method may further comprise providing a list of store locations to the customer. In some implementations the store indicator may include data indicative of a store location of the list of store locations, where the store location is selected by the customer. In some implementations the list of store locations may be based on a log of past visits of the customer. In some implementations the list of store locations may be provided via a map-based service.

In some implementations the customer order entry may include the store indicator. In some implementations the plurality of menu options may be based on the store indicator.

In some implementations identifying the store indicator may be based on determining proximity of the customer to the proximity device.

Other implementations may include methods and apparatus providing a centralized customer order processing system with automatic detection of customer arrival at an order pick-up location implemented on a mobile application. In some implementations a computer implemented method may be provided that includes the steps of: providing a customer order entry to a central server, the customer order entry including a customer identifier identifying a customer record, and an electronic customer order including a predefined selection of at least one menu option from a plurality of menu options; identifying a store indicator indicative of a store location; detecting, via the mobile device of a customer, a proximity signal from a proximity device located at the store location; invoking, in response to detection of the proximity signal, a mobile application on the mobile device of the customer; and transmitting an order activation signal to a given server, the order activation signal indicative of proximity of the customer to the proximity device located at the store location, wherein the order activation signal prompts the given server to activate the customer order entry at a store server.

This method and other implementations of the technology disclosed can each optionally include one or more of the following features.

In some implementations invoking the mobile application may occur when the mobile device of the customer determines proximity of the mobile device within a threshold distance of the proximity device.

In some implementations the proximity device may be proximate to an order selection board at the identified store location.

In some implementations the proximity device may be a low energy transmission device.

In some implementations the plurality of menu options may be based on a log of past menu selections of the customer, where the past menu selections may be stored in at least one database.

The method may further comprise providing a list of store locations to the customer. In some implementations the store indicator may include data indicative of a store location of the list of store locations, the store location selected by the customer. In some implementations the customer order entry may include the store indicator. In some implementations the plurality of menu options may be based on the store indicator. In some implementations the list of store locations may be based on a log of past visits of the customer. In some implementations the list of store locations may be provided via a map-based service.

In some implementations identifying the store indicator may be based on determining proximity of the customer to the proximity device.

In some implementations identifying the store indicator may include prompting the central server to route the customer order entry to a store server at the identified store location.

The method may further comprise providing payment information for the electronic customer order. In some implementations the payment information may be included in the customer order entry. The method may further comprise authorizing the central server to complete a financial transaction based on the payment information. In some implementations the payment information may be based on a log of past payment information for the electronic customer order, where the log of past payment information may be stored on the mobile device.

In some implementations the given server may be the central server.

In some implementations the given server may be the store server.

Yet another implementation a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein provide detection of proximity of the computing device of the customer to a store location, and activation of an electronic customer order based on proximity. Particular implementations of the subject matter described herein may detect proximity of the computing device of the customer to a drive-through location at a store. Particular implementations of the subject matter described herein may route the electronic customer order to the store location based on detection of proximity of the customer to the store location.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
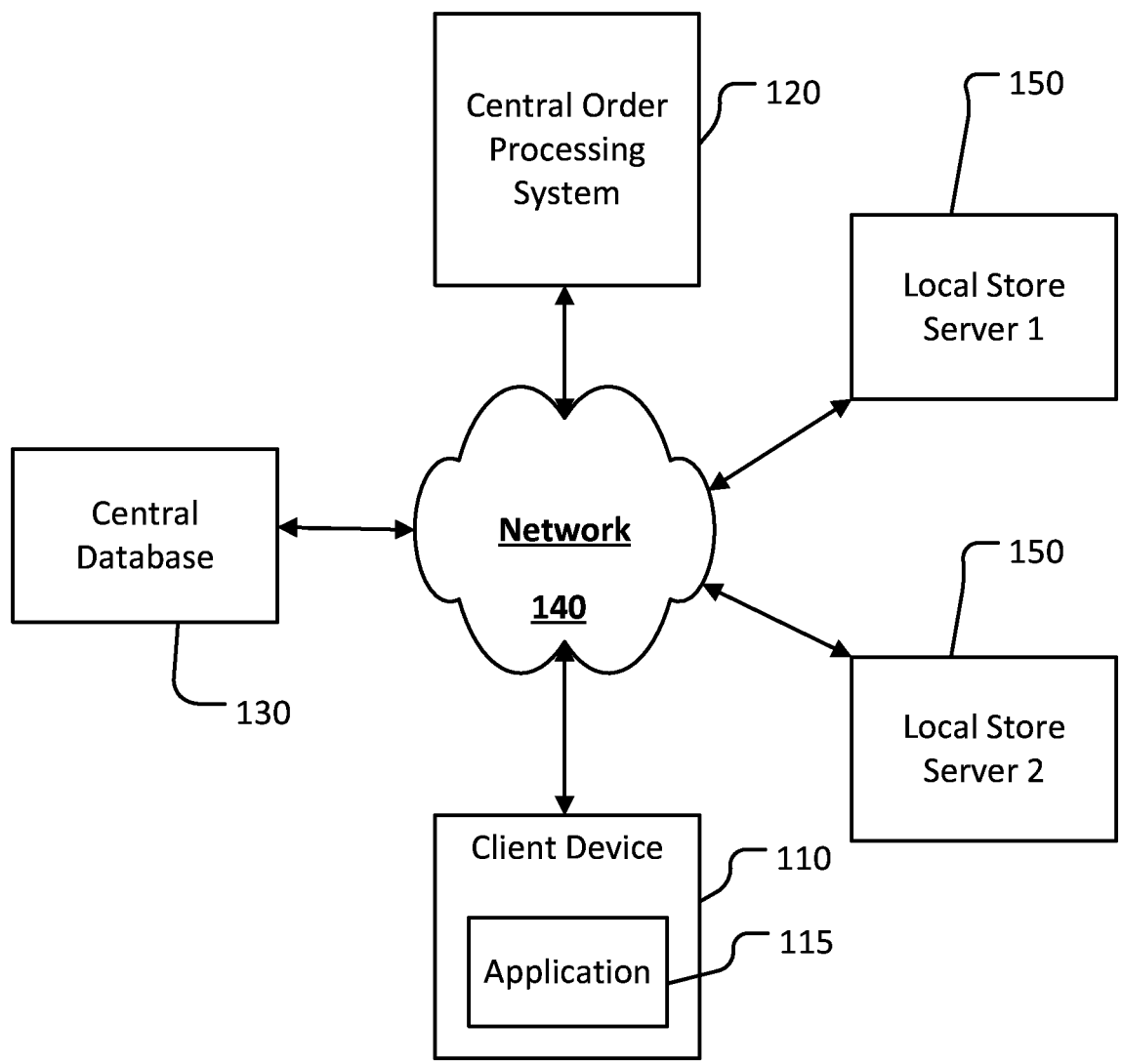
FIG. 1 illustrates a block diagram of an example environment in which the centralized customer order processing system with automatic detection of customer arrival is implemented.

FIG. 1 illustrates a block diagram of an example environment in which a centralized customer order processing system with automatic detection of customer arrival is implemented. The example environment of FIG. 1 may include a client device 110, a central order processing system 120, a central database 130, and/or one or more local store servers 150. The environment 100 may also include a communication network 140 that enables communication between various components of the environment 100. In some implementations the communication network 140 may include the Internet, one or more intranets, and/or one or more bus subsystems. The communication network 140 may optionally utilize one or more standard communications technologies, protocols, and/or inter-process communication techniques. The communication network 140 is an example of an information retrieval system in which the systems, components, and techniques described herein may be implemented and/or with which the systems, components, and techniques described herein may interface.

In some implementations a user may interact with the central order processing system 120 through a client device 110. The client device 110 may be, for example, a desktop computer, a laptop, a tablet computer, and/or a mobile device of the user. Additional and/or alternative computing devices of the user may be provided. The client device 110 and the central order processing system 120 each include memory for storage of data and software applications, a processor for accessing data and executing applications, and components that facilitate communication over a communication network 140. The operations performed by the client device 110 and/or the central order processing system 120 may be distributed across multiple computer systems. In some implementations, parts of the communications network 140 and/or one or more of the components may reside on a cloud server. For example, the central order processing system 120 may be hosted on one or more cloud servers.

The client device 110 may execute one or more applications, such as application 115 (e.g., a mobile application), or utilize one or more websites, that may enable the user to receive selectable menu options and submit menu selections to the central order processing system 120. As discussed herein, the term "client device" may refer to different devices within a single implementation. For example, a customer may place an order from home using a desktop computer and/or a laptop. In such instances, "client device" will refer to the desktop computer and/or the laptop, and application 115 may be a web browser running on the desktop computer. However, when the customer arrives at the drive-through after providing the electronic customer order, the transmission of the proximity signal and/or payment processing may occur via a mobile application running on a mobile device of the customer. In such instances, "client device" will refer to the mobile device of the customer, and application 115 may be the mobile application running on the mobile device of the customer.

In some implementations a customer order entry may be received at the central order processing system 120. The customer order entry may include data related to an electronic customer order. The customer order entry may include a customer identifier identifying a customer record, and an electronic customer order including a predefined selection of at least one menu option from a plurality of menu options. In some implementations the customer order entry may include payment information, one or more electronic coupons, and so forth. In some implementations the customer order entry may include an estimated time of arrival at a store location for order pick-up. The estimated time of arrival may be provided by the customer, and/or it may be calculated utilizing one or more conventional techniques.

In some implementations the customer order entry may include a customer identifier identifying the customer record. The customer identifier is an identifier associated with a customer record. For example, the customer identifier may be one or more of a name, address, phone number and customer number associated with the customer. For example, the customer identifier may be "<John Smith>", identifying the customer record as John Smith. As another example, the customer identifier may be "<Smith_502_123_4567>" identifying the customer record as Smith, and associating Smith with a telephone number of 502-123-4567.

In some implementations the customer order entry may include an electronic customer order. The electronic customer order may include a predefined selection of at least one menu option from a plurality of menu options. In some implementations the electronic customer order may be an order number generated by the central order processing system 120 and associated with the customer order. For example, the electronic customer order may be an order number and/or a list of at least one number representative of the at least one menu option from a plurality of menu options. For example, the customer may select items "2", "5", and "9" from the plurality of menu options. Item "2" may represent a sandwich, item "5" may represent a donut, and item "9" may represent a small coffee. Accordingly, the electronic customer order may be "<1234; 2, 5, 9>", where "1234" is an order number associated with the electronic customer order.

In some implementations the customer order entry may include an electronic customer order related to a plurality of customer orders. For example, the customer may indicate a desire to purchase a cup of coffee and a donut every weekday. The customer order entry may include a plurality of customer orders, one for each weekday. As another example, the customer may indicate a desire to purchase a sandwich every Saturday for four Saturdays. The customer order entry may include a plurality of customer orders, one for each of the four Saturdays.

In some implementations the customer order entry may be associated with a unique order identifier. For example, the unique order identifier may be the electronic customer order. As another example, the unique order identifier may be the order number associated with the electronic customer order. In some implementations the unique order identifier may be generated by the computing device of the customer. In some implementations the unique order identifier may be generated by the central order processing system 120.

In some implementations a list of store locations may be provided to the customer. In some implementations the list of store locations may be provided via client device 110. In some implementations an application 115 on client device 110 may be configured to store information related to store locations in a memory subsystem. In some implementations the list of store locations may be stored in a database such as central database 130. In some implementations a list of store locations may be extracted from such locations based on one or more factors. For example, the list of store locations may be provided in response to one or more customer inputs. In some implementations the list of store locations may be provided by the central order processing system 120, and/or an external mapping service.

The list of store locations may be provided based on one or more factors, such as customer location, customer's preferred order pick-up location, customer's past preferences for order pick-up, and customer traffic patterns at one or more store locations. In some implementations the list of store locations may be provided via a user interface on the client device 110. In some implementations application 115 may be configured to display the user interface. In some implementations the user interface may be an interactive display. For example, the user interface may be an interactive graphical user interface.

In some implementations the central order processing system 120 and/or an application 115 running on client device 110 may prompt the customer to enter a city and state, and/or a postal zip code within a search menu on the user interface. The customer may be additionally provided with selectable options for narrowing search results based on radius from the entered location, location amenities (e.g., 24-Hour Service, Drive-through service, and mobile-enabled location). Upon receipt of the customer location preferences, the central order processing system 120 may search for, and provide, a list of store locations to the customer. In some implementations the central order processing system 120 may access an external service to provide the list of store locations on a display of the client device 110. For example, the central order processing system 120 may provide the customer location preferences to an external map-based service that may provide the list of store locations to the customer on a graphical display of the client device 110.

When the customer is provided with a list of store locations, the customer may select a store location from the list of store locations. A store indicator identifying the identified store location may be generated. The store indicator is an identifier associated with a store location. For example, the store indicator may be a street address for the identified store location. As another example, the store indicator may be a GPS coordinate associated with the identified store location. In some implementations the store indicator may be a unique identifier associated with a store location. For example, the store indicator may be a store identification number (e.g., Store 1234) associated with the identified store location.

The central order processing system 120 may receive the identified store location and provide the customer with a plurality of menu options. The central order processing system 120 may receive electronic customer orders from the client device 110 and/or other component and may communicate with the client device 110 and one or more local servers 150 and/or the central database 130 to process the electronic customer order. For example, the central order processing system 120 may receive an indication from a client device 110 that a customer has selected a store location. In response, the central order processing system 120 may retrieve a plurality of menu options tailored to the identified store location and/or the customer associated with the client device 110. Such menu options may be provided to the customer via the client device 110.

For example, the central order processing system 120 may identify the store location as "Store 1234". The central order processing system 120 may access the central database 130 and/or the local store server 150 at the identified store location to retrieve the plurality of menu options offered by the identified store location. For example, Store 1234 may offer a different special each weekday morning. As another example, Store 1234 may offer a free drink with an order of a sandwich. Such menu options may be provided to the customer via the client device 110.

In some implementations the central database 130 may include a database of structured data that includes nodes that represent customers and identifies the historical customer order, past menu selections, and/or past payment information of the customer. A node representing a customer may also be associated with metadata in the database of structured data (e.g., via links that represent preferences of the customer). Any included metadata may include, for example, a customer's name, an address, a phone number, and email address, and/or additional descriptive information about the customer, among other data. In some implementations the central database 130 may include an index of electronic customer orders, past menu selections, and/or associated customers. For example, for each customer, a mapping (e.g., data defining an association) between the customer and one or more past and/or current menu selections related to the customer may be identified in the central database 120. A customer may be related to an order if the customer placed the order in the past. In some implementations the association between a customer and an order may only be defined if the number of times the customer placed the order satisfies a threshold.

In some implementations the menu options may be based on a log of past menu selections of the customer, the past menu selections stored in at least one database, such as central database 130. In some implementations one or more aspects of customer preferences may be obtained from the central database 130. In some implementations the central order processing system 120 may access the central database 130 to identify stored associations between customers and past menu selections. In some implementations the central database 130 may be omitted. For example, in some implementations an association between a customer and one or more orders may be determined upon receipt of the order and may not be stored in a database such as the central database 130 for future retrieval.

In this specification, the term "database" will be used broadly to refer to any collection of data. The data of a database does not need to be structured in any particular way, or structured at all, and it may be stored on storage devices in one or more locations. Thus, for example, the central database 130 may include multiple collections of data, each of which may be organized and accessed differently.

Additional and/or alternative factors may be utilized in associating a customer with one or more orders. For example, in some implementations the customer may provide input to associate the customer with one or more orders. For example, the customer may select preferred orders for one or more days of the week. The customer may prefer a cup of small coffee and a donut each weekday morning at 7 AM, and may prefer a large latte with a sandwich each Saturday morning at 10 AM. The central order processing system 120 may receive such customer preferences via a computing device 110. The central order processing system 120 may additionally associate the customer with the preferred orders, and provide the associations to the central database 130. The central database 130 may store the associations for future retrieval by the central order processing system 120.

In some implementations the client device 110 may facilitate customer selection of menu options by providing one or more selectable menu options to the customer in response to a partial order entered by a customer. For example, when the customer orders coffee, the central order processing system 120 and/or a mobile application on the client device 110 may provide the customer with one or more selectable menu options to choose a food and/or other items, such as a sandwich, a donut, and so forth. As another example, the central order processing system 120 and/or a mobile application on the client device 110 may provide the customer with a prepared selection of menu items. The prepared selection of menu items may be based on the customer's past preferences, and/or may be specials offered by a store location selected by the customer. The user may interact with (e.g., tap, click, or otherwise affirmatively select) one of the provided one or more selectable menu options to select and/or cancel the one or more selectable menu option.

In some implementation the one or more selectable menu options may be provided to a user via a computing device 110. In some implementations the one or more selectable menu options may be presented within a user-editable field as a menu option; presented as a pop-up window; presented as a drop-down menu; and/or may appear in a box. The box may be positioned anywhere on the display, such as a side panel or overlaid onto the user-editable document. In some implementations the one or more selectable menu options may become visible as user-initiated activity is detected in a search box. In some implementations the number of one or more selectable menu options displayed may depend on the computing device 110. For example, fewer one or more selectable menu options may be displayed on a mobile device than may be displayed on a desktop device.

As discussed herein, the plurality of menu options may be tailored to the customer (e.g., based on past selection of menu options), and/or tailored to the identified store location (e.g., promotions offered at the identified store location).

In some implementations the customer identifier, the store indicator, and the electronic customer order may be collated together by the mobile device to generate a customer order entry. The customer order entry may be provided by the client device 110 to the central order processing system 120.

In some implementations the customer order entry may include a digital code, such as a Quick Response Code ("QR code") associated with the electronic customer order. The digital code may be an optically machine-readable code that records information related to the electronic customer order. For example, the digital code may include one or more of the customer record, the electronic customer order, unique order identifier, store indicator, and payment information. In some implementations, the mobile application on the computing device of the customer may be configured to generate the digital code. In some implementations the digital code may be generated by the central order processing system 120.

In some implementations the customer order entry may be received by the central order processing system 120. The customer order entry may include the customer identifier identifying the customer record, and the electronic customer order including the predefined selection of at least one menu option from the plurality of menu options. In some implementations the central order processing system 120 may receive a customer order entry including payment information, one or more coupons, and so forth. In some implementations the central order processing system 120 may store the customer order entry in a database such as central database 120 and associate the customer order entry with a unique order identifier. For example, the customer order entry may include an electronic customer order such as "<1234; 2, 5, 9>", where "1234" is an order number, and the central order processing system 120 may associate the customer order entry with a unique order identifier such as "1234-2-5-9". In some implementations the central order processing system 120 may provide the unique order identifier to the computing device of the customer. As another example, the customer order entry may include a QR code, and the central order processing system 120 may associate the customer order entry with the QR code.

In some implementations, when a store location is known, the central order processing system 120 may route the customer order entry to a local store server 150 at the store location indicated by the store indicator at the time the customer order entry is received. In some implementations the store location for order pick-up may not be known. In such situations the central order processing system 120 may save the customer order entry on a central server for potential routing to a local store server 150. In such instances the central order processing system 120 may route the customer order entry to a local store server 150 at the store location indicated by the store indicator, upon detection of proximity of the computing device of the customer to the proximity device at the identified store location. In some implementations the central order processing system 120 may provide the unique order identifier to the local store server 150. For example, the central order processing system 120 may provide the unique order identifier "1234-2-5-9" associated with the customer order entry to the local store server 150.

Routing generally occurs at the time the store indicator is identified. For example, the customer order entry may include the store indicator for the identified store location (e.g., when the store location is pre-selected). In such instances, the central order processing system 120 may receive the customer order entry and route it to a local store server 150 at the identified store location.

Also, for example, the store indicator may be identified based on detection of proximity of the computing device of the customer to the proximity device. As discussed herein, the computing device may be configured to receive the proximity signal from the proximity device, and optionally identify a store locator based on the proximity signal. In some implementations the computing device may provide a signal identifier associated with the proximity signal to the central order processing system 120. In come implementations the central order processing system 120 may identify the store indicator based on the signal identifier. Once the store identifier is identified, the store location indicated by the store identifier may also be identified. Accordingly, the central order processing system 120 may route the customer order entry to the local store server 150 at the identified store location.

A local store server 150 processes orders locally at a store location. The local store server 150 may receive a customer order entry from the central order processing system 120. In some implementations the customer order entry may be placed on a virtual deferred queue on the store's local network (e.g., intranet, local area network, wide area network). In some implementations the local store server 150 may generate a status identifier for the customer order entry indicating that the customer order entry is inactive. In some implementations the status identifier may be transmitted to the central order processing system 120. In some implementations the status identifier may be generated by the central order processing system 120.

In some implementations, after providing the customer order entry to the central order processing system 120, the customer may approach a store location for order pick-up. In some implementations the customer may approach an identified store location. The customer may enter the drive-through in a vehicle, may walk up to a point of sale, and/or may walk up to the drive-through pick-up location (e.g., a drive-through window). The mobile device 110 of the customer may be configured to detect a proximity signal emitted by a proximity device. The proximity device may be placed at a location in the drive-through area. For example, an establishment offering drive-through customer ordering generally has an order selection board that displays the menu options available to the customer. In such instances, the proximity device may be placed proximate to the order selection board. In some implementations the proximity device may be placed at or near the order selection board. The precise location of the proximity device may depend on the physical configuration of the store location. In some implementation the precise location of the proximity device may additionally, and/or alternatively depend on the time interval from customer order activation to customer order delivery. Such a time interval may be statistically determined based on average vehicle speeds in the drive-through area and/or customer order processing times at the identified store location.

As discussed herein, the time interval from customer order activation to customer order delivery may be critical to maintaining quality control, increasing efficiency of customer order processing, and providing optimal customer satisfaction. For example, a cup of coffee may be too hot or too cold based on the time interval from customer order activation to customer order delivery. Also, for example, the coffee may lose some of its flavor if such time interval is too long. As another example, the customer order may not be ready for delivery if the time interval is too short. This may lead to additional lag times in customer order delivery, resulting in long waiting times in the drive-through.

In general, the store location is in the best position to determine order processing times. As a result, the customer may be less likely to determine the optimal time between activation of an order and delivery of the order. Given the criticality of the time interval from customer order activation to customer order delivery, it may not be desirable for the activation time for the customer order to be determined by the customer. Accordingly, it is desirable to have systems and methods as disclosed herein, to automatically detect proximity of the computing device of the customer to a store location, and trigger activation of the customer order based on such proximity.

In some implementations the time interval from customer order activation to customer order delivery may vary based on demand at the store location. For example, the store location may receive a large number of walk-in customers during lunch hours on weekdays. Due to added demand, the length of the time interval from customer order activation to customer order delivery may be increased. Accordingly, the precise location of the proximity device may be adjusted so as to accommodate the increased length of the time interval.

The time interval from customer order activation to customer order delivery is also critical for another reason. Ensuring a uniform length of the time interval from customer order activation to customer order delivery via a centrally activated customer order processing system enables the store location to increase efficiency by maintaining a steady flow of traffic in the drive-through area. The employees preparing the customer order may continue work at a steady pace without having to deal with the added stress of backed-up traffic in the drive-through area. A well-managed workflow process allows the employees to focus on swift and efficient customer order delivery without processing errors, leading to customer satisfaction.

In some implementations such detection of proximity of the computing device of the customer and activation of customer order may be implemented via one or more background processes running on the mobile device of the customer. Although distances and/or queue positions may be determined (e.g., based on one or more algorithms) by the local store server and/or the central server, the systems and methods disclosed herein do not require the central server and/or the local store server to implement such detection and computation algorithms. Instead, a proximity device at a store location may emit a proximity signal which may be detected by the mobile device (e.g., a background process running on the mobile device).

One or more techniques may be utilized to detect proximity of the computing device of the customer to the proximity device. In some implementations the proximity device may be a low-energy transmission device. For example, the low-energy transmission device may be a low-energy Bluetooth device. A low-energy transmission device may keep the energy consumption at a minimum. The energy savings aspects are especially significant for the mobile device. The low-energy transmission device may be a dual mode beacon that allows for two-way communication between connected devices. In some implementations the low-energy transmission device may be a single-mode device that transmits a proximity signal without the capability of receiving a signal. Therefore, the single-mode transmission device may not require the added functionalities associated with device discovery and/or pairing of devices. The single-mode transmission device also may not be required to maintain secure networks for transactions (e.g., financial transactions). Accordingly, a relatively less expensive microcontroller may be utilized with a smaller associated random access memory ("RAM"). Additionally, the single-mode device may require a reduced software stack resulting in added energy savings for the mobile device. In this mode, the transmission device may only transmit a proximity signal and a nearby device (e.g., mobile device of the customer) equipped with a "receive" functionality may receive the signal.

In some implementations the single-mode transmission device may have the capability of transmitting packets of information as part of the proximity signal. Such packets of information may include one or more of an identifier of the transmission device, GPS coordinates of the transmission device, a store indicator, and advertisement packets provided by the store location.

In some implementations the proximity device may transmit a proximity signal (e.g., a beacon signal). In some implementations the proximity signal may be transmitted continuously during operation hours of the store location. In some implementations the proximity signal may be of limited range. As the customer approaches the drive-through area for order pick-up, the mobile device 110 of the customer may detect the proximity signal. In some implementations the mobile device 110 may be configured to receive a proximity signal, identify strength of the proximity signal, and determine the distance from the proximity device.

For example, the proximity signal may be detected by the mobile device 110 when the customer is a mile away from the identified store location. However, if the customer order entry is activated at such time, the time interval from customer order entry activation to customer order pick-up may be longer than a desired length of time interval. This may result in decreased customer satisfaction. Accordingly, the mobile device 110 may not transmit an order activation signal to the central order processing system 120 and/or the local store server 150 when the customer is a mile away from the identified store location. In some implementations the optimal time for customer order entry activation may be when the customer is within a threshold distance away from the proximity device. In some implementations such threshold distance may be 3-4 feet. Accordingly, when the mobile device 110 determines that the proximity device is within the threshold distance, the mobile device 110 may transmit an order activation signal to the central order processing system 120 and/or the local store server 150.

Determination of proximity of the mobile device 110 to the proximity device may be based on one or more techniques. In some implementations the signal strength of the proximity signal emitted by the proximity device may be utilized to determine proximity of the mobile device 110 to the proximity device. Signal strength may be measured utilizing one or more techniques. For example, a received signal strength indicator ("RSSI") is an indication of the power present in a received signal. In some implementations the RSSI may depend on the distance from the source of the signal. For example, the RSSI may be proportional to the distance of the mobile device 110 from the proximity device. As the mobile device 110 of the customer gets closer to the proximity device, the RSSI may increase. Accordingly, the RSSI may be utilized as an indicator of proximity of the computing device of the customer to a store location. One or more background processes in the mobile device 110 may be configured to detect the RSSI.

In some implementations a distance look-up table may be determined. The distance look-up table may map the RSSI to estimated distance from the signal source. Such a distance look-up table may be stored on the mobile device 110 (e.g., as Read-only-Memory). Additionally, the distance look-up table may be accessible to the one or more background processes in the mobile device 110 that may be configured to detect the RSSI. The background processes may receive the RSSI, access the distance look-up table, associate the RSSI to the corresponding estimated distance, and determine the estimated distance of the mobile device 110 from proximity device. In some implementations a range of accessible values for the RSSI may be subdivided into smaller subintervals. Each subinterval may be associated with a distance interval. For example, signal range 1 may be associated with a distance interval corresponding to one mile to half a mile from the proximity device. As another example, signal range 5 may be associated with a distance interval corresponding to 10 feet to 4 feet from the proximity device.

In some implementations the mobile device 110 may determine that the proximity device is within the threshold distance (e.g., 3-4 feet) of the mobile device 110. In some implementations when the mobile device is within a threshold distance of the proximity device, a mobile application 115 may be automatically invoked on the mobile device (e.g., via one or more background processes), and an order activation signal transmitted to the central order processing system 120 and/or the local store server 150.

The order activation signal may be indicative of proximity of the computing device to a proximity device located at the identified store location. Receipt of the order activation signal is indicative of proximity of the computing device of the customer to the proximity device. Additionally, the order activation signal may identify the customer order entry to the central order processing system 120 and/or the local store server 150. For example, the order activation signal may include a unique order identifier (e.g., order number) associated with the customer order entry. As another example, the order activation signal may include the digital code, such as a QR code.

In some implementations upon receipt of the order activation signal from the mobile application 115, the central order processing system 120 may prompt local store server 150 to activate the customer order entry. For example, the central order processing system 120 may receive the order activation signal including a unique order identifier "1234-2-5-9" and/or a QR code. The central order processing system 120 may identify the customer order entry associated with the unique order identifier and/or QR code and prompt the local store server 150 to activate the customer order entry. In some implementations the central order processing system 120 may provide the unique order identifier "1234-2-5-9" and/or QR code to the local store server 150. The local store server 150 may identify the customer order entry associated with the unique order identifier and activate the customer order entry. The mobile device 110, and/or the mobile application 115 may transmit an order activation signal indicating arrival of the customer at the store location. Accordingly, the central order processing system 120 may receive the order activation signal from the mobile device 110 of the customer.

In some implementations the central order processing system 120 may notify the local store server 150 of proximity of the computing device of the customer to the drive-through location at the identified store location, and prompt the local store server 150 to activate the customer order entry. In some implementations the order activation signal may be directly transmitted by the mobile device of the customer to the local store server 150, instead of via the central order processing system 120. In such instances, the local store server 150 may activate the customer order entry for further processing. Such activation marks the beginning of the critical time interval between customer order entry activation and customer order delivery.

In some implementations the proximity device located at the drive-through may provide a signal identifier as part of the proximity signal. The signal identifier may include one or more of store identification data, signal identification data, and location data (e.g., MAC address, GPS coordinates, an IP address). The mobile application 115 may be configured to receive such data and optionally decode it, if such data is presented in coded format.

In some implementations the mobile device 110 may provide such received signal identifier to the central order processing system 120. The central order processing system 120 may be configured to identify a unique store location associated with the received signal identifier. For example, central database 130 may include a location look-up table associating one or more aspects of a signal identifier with a unique store location. In some implementations store identification data (e.g., a unique store number) may be associated with a unique store location, and such store identification data may be stored in the central database 130. When the central order processing system 120 receives the store identification data, it may access the location look-up table in the central database to look up the associated unique store location. As another example, location data (e.g., a MAC address) may be associated with a unique store location, and such data may be stored in the central database 130. When the central order processing system 120 receives the location data, it may access the location look-up table in the central database to look up the associated unique store location.

In some implementations the signal identifier from a store location may be associated with a set of proximate GPS coordinates in the location look-up table. For example, a first set of proximate GPS coordinates may be uniquely associated with a first store location. For example, the first set may include all GPS coordinates within half a mile of the first store location. The mobile device 110 may be configured to identify its own geolocation data based on GPS coordinates. Upon detection of the proximity signal, the mobile device 110 may compare its geolocation data to the first set of proximate GPS coordinates. If the geolocation data is in the first set of proximate GPS coordinates, the first store location may be identified as the store location proximate to the customer. If the geolocation data based on GPS coordinates is not in the first set of proximate GPS coordinates, the mobile device 110 may periodically update its own geolocation data and continue comparing its geolocation data with the sets of proximate GPS coordinates in the location look-up table until a match is identified.

Upon identification of a given store location as the customer's preferred pick-up location, the central order processing system 120 may route the customer order entry from the central order processing server 120 to a local store server 150 at the identified store location. In some implementations the activation of the customer order entry may occur at the same time utilizing the methods disclosed herein. In some implementations the identification of the store location may precede the activation of the customer order entry. For example, the store location may be identified based on detection of a first proximity signal when the mobile device 110 is half a mile away from the proximity device. However, the customer order entry may be activated upon detection of a second proximity signal (e.g., when the mobile device 110 is within 3 feet of the proximity device).

In some implementations the customer may select a first store location at the time the electronic customer order is submitted. The central order processing system 120 may receive a first store indicator identifying the first store location. In some implementations, based on detection of proximity of the computing device of the customer to a store location, the central order processing system 120 may receive a second store indicator identifying a second store location. The central order processing system 120 may compare the first store indicator with the second store indicator. A logic module in the central order processing system 120 may be configured such that when the comparison of the first store indicator with the second store indicator indicates a match, it may be determined that the customer has arrived at the first store location. In such an instance, the logic module may be able to further determine that the customer order entry has been correctly routed to the first store location.

However, if the comparison of the first store indicator with the second store indicator indicates that a match has not occurred, the logic module in the central order processing system 120 may be able to infer that the customer has arrived at a store location different from the first store location. In such an instance, the logic module may further determine that the customer order entry has been incorrectly routed to the first store location. Accordingly, the central order processing system 120 may send an indication to the first local store server 150 at the first store location that the customer order entry be removed from its server. Additionally and/or alternatively, the central order processing system 120 may route the customer order entry to a second local store server 150 at the second store location, and the second local store server 150 at the second store location may proceed with further processing of the customer order entry. In some implementations the customer preference to pick up the order at the second store location, instead of the first store location, may be confirmed before the customer order entry is routed to the second local store server 150 at the second store location.

In some implementations the mobile device 110 may confirm the electronic customer order and prompt the central order processing system 120 to activate the order. In some implementations the central order processing system 120 may confirm the electronic customer order and prompt the local store server 150 to activate the customer order entry. In some implementations the local store server 150 may confirm the electronic customer order and activate the customer order entry.

In some implementations a status identifier for the customer order entry may be updated to indicate that the customer order entry is active. The local store server 150 may transmit the electronic customer order to the kitchen (e.g., a kitchen server). The electronic customer order may be displayed in the kitchen (e.g., on a display screen). The electronic customer order may be optionally queued in a virtual active queue. Kitchen employees may then prepare a customer order associated with the electronic customer order for delivery. For example, the electronic customer order may be the electronic customer order may be "<2, 5, 9>", indicating that the customer selected items "2", "5", and "9" from the plurality of menu options. Item "2" may represent a sandwich, item "5" may represent a donut, and item "9" may represent a small coffee. Accordingly, the kitchen employees may prepare an order including a sandwich, a donut, and a small coffee for delivery.

In some implementations a payment transaction may be processed via communication between the mobile device 110 and the central order processing system 120. In some implementations the payment transaction may have been pre-processed at the time customer order entry is submitted. In some implementations the local store server 150 may optionally transmit the electronic customer order to a cash register at a point-of-sale to process payment information. In some implementations the customer may initiate and complete the payment transaction while at the drive-through window of the store location. In some implementations the customer may initiate and complete the payment transaction while in the drive-through area of the store location. This may be achieved via the mobile device 110. In some implementations the payment transaction may be completed via a payment kiosk located in the drive-through area. In some implementations the payment transaction may be completed upon delivery of the customer order associated with the electronic customer order. In some implementations it may be desirable for the central order processing system 120 to centrally process all financial transactions, thereby minimizing the need for the customer's sensitive financial information to be distributed to multiple servers and/or over multiple networks.

Additionally and/or alternatively, customer payment may be processed by transmitting the payment information from the local store server 150 to an external financial entity. For example, the central order processing system 120 may route a customer order entry to the local store server 150, where the customer order entry includes payment information for the electronic customer order. Upon activation of the customer order entry, and/or upon confirmation of the electronic customer order, the local store server 150 may access an external financial entity to process customer payment. In some implementations such payment may be processed automatically with prior customer authorization. For example, the payment information may include a customer's credit card information (e.g., credit card number, statement address, authorization code). The customer may have authorized payment at the time the electronic customer order was submitted. Accordingly, upon activation of the customer order entry, and/or upon confirmation of the electronic customer order, the local store server 150 may provide the customer's credit card information to the external financial entity to process customer payment.

In some implementations, customer payment may be processed subsequent to customer authorization at the time of order pick-up. For example, the payment information may include a customer's credit card information (e.g., credit card number, statement address, authorization code). Upon activation of the customer order entry, and/or upon confirmation of the electronic customer order, the local store server 150 may prompt the customer to submit the customer's credit card information. The local store server 150 may then submit the payment information to the external financial entity for payment processing. In some implementations the local store server 150 may prompt the customer to submit payment information by providing a selectable menu option on the mobile device. The customer may submit the payment information by selecting the selectable menu option. In some implementations an attendant at the identified store location may manually confirm submission of the customer's credit card information prior to providing such information to the external financial entity. In some implementations the customer's credit card information may not be included in the customer order entry and the customer may choose to pay at the drive-through location via one or more payment methods (e.g., cash, credit card, debit card, coupon).

In some implementations the payment may be processed by transmitting the payment information from the central order processing system 120 to the external financial entity. In some implementations payment may be processed by transmitting the payment information from the mobile device 110 to the external financial entity. As discussed herein, in some implementations payment may be submitted and processed at the store location (e.g., at the drive-through window, at a cash register, at a point of sale) at the time the customer order associated with the electronic customer order is picked up. In some implementations the payment information may be based on a log of past payment information for the electronic customer order. Such a log of past payment information for the customer order may be stored in a database such as central database 120. In some implementations the log of past payment information may be stored on the mobile device. For example, if the customer has made past payments via a credit card, then the payment information related to the credit card may be stored in the mobile device 110 and/or the central database 120. Additionally and/or alternatively, such log of past payment information may be associated with the customer. In some implementations the mobile application on the mobile device may be configured to store the payment information in a memory subsystem and may be additionally and/or alternatively configured to access such payment information. For example, when the customer selects the at least one menu option, the mobile application may access the payment information and provide this to the customer. In some implementations the customer may choose to include such payment information in the customer order entry. As another example, when the customer confirms the electronic customer order in the drive-through location, the mobile application may access the payment information and provide this to the customer. In some implementations the customer may choose to submit such payment information to the central order processing system 120, and/or the local store server 150 for further processing.

As discussed herein, there may be minimal need for the local store server 150 to communicate with a plurality of customer mobile devices in the drive-through area. This may reduce the network traffic on the store's local area network. Additionally, and/or alternatively, this may simplify the local store server system by eliminating processes and logic modules that may be needed to process one or more aspects of the customer order entry prior to activation of the customer order entry. Therefore, minimizing the need for the customer mobile device to communicate with the store's local area network may increase network efficiency during peak hours, leading to efficiency in order processing, and/or reduction of errors in order processing.

As discussed herein, in some implementations the proximity device may be a low-energy device. Accordingly, two-way data exchange between the proximity device and the mobile device of the customer may not be necessary, thereby minimizing the need for sophisticated microcontrollers on the proximity device. This may additionally reduce energy consumption by the mobile device because the mobile device may no longer be required to pair with the proximity device and/or the local store server. Likewise, energy consumption by the mobile device may be additionally and/or alternatively minimized by eliminating the requirement for the mobile device to establish and/or maintain secure communication protocols with the proximity device and/or the local store server.

Also, as disclosed herein, the automatic detection of proximity has the advantage of providing a hands-free drive-through experience for the customer. For example, a customer may provide a customer order entry to the central order processing system 120. The customer order entry may include a selected store location. Additionally, the customer may pre-pay for the customer order. For example, the customer order entry may include payment confirmation. The customer order entry may be routed to the local store server 150 at the selected store location. The customer may then drive to the selected store location for order pick-up. One or more background processes on the mobile device of the customer may detect a proximity signal transmitted by a proximity device. The mobile device of the customer may transmit an order activation signal and the customer order entry may be activated at the local store server 150 at the selected store location for further processing. The customer may drive up to the drive-through window and pick up the order.

Accordingly, processing electronic customer orders via a centralized order processing system may result in better customer delivery systems. Sensitive customer data may be stored in a central database, thereby minimizing the need for unnecessary distribution to, processing at and/or storage on local store servers.

Additional and/or alternative implementations of the systems and methods disclosed herein may be included. In some implementations the electronic customer order may be confirmed before activation of the customer order entry. One or more of the central order processing system 120, the mobile application 115, and the local store server 150 may request confirmation of the electronic customer order. The confirmation request may be in the form of a pop-up menu on the mobile device 110, with an option to accept and/or reject the electronic customer order. In some implementations confirmation request may be an audio prompt at the drive-through location. For example, the local store server 150 may receive notification of proximity of the computing device of the customer to the drive-through location. The local store server 150 may then issue an automatic confirmation request via a pre-recorded audio prompt. For example, an automated voice messaging service may be configured to ask, "Did you request a small decaffeinated coffee with no sugar and two donuts?" The customer may respond "Yes" or "No" and such response may be transcribed from audio and the response provided to the local store server 150. The digital data associated with a transcribed "Yes" response may be associated with an affirmative positive confirmation of the electronic customer order, thereby activating the customer order entry. The digital data associated with a transcribed "No" response may be associated with an affirmative negative confirmation of the electronic customer order, thereby not immediately activating the customer order entry. In such a situation the customer may be provided with one or more ways to rectify the customer order entry. For example, the customer may be provided with an option to place the order at the order selection board. As another example, an employee may assist the customer in correcting the order. Also, for example, the customer may be given the option to place a corrected customer order via the mobile application 115 on the mobile device 110.

Yet another advantage of utilizing a central server to process the electronic customer order is the ability to identify a store location by detecting the customer's proximity to a store location, and routing the electronic customer order to the local store server at the identified store location for activation and processing. For example, the store location may not be pre-selected by the customer, and/or the customer may arrive at a store location other than a pre-identified store location. In such instances, the store indicator may be based on determining proximity of the customer to the proximity device. In some implementations the store indicator may be generated by the mobile device 110 and/or central order processing system 120 upon detection of a proximity signal. For example, a customer may submit a customer order entry, including menu selections, to the central order processing system 120. The customer order entry may be saved in the central order processing system 120. Subsequently, the customer may arrive at a store location. Utilizing the methods disclosed herein, the mobile device 110 of the customer may detect the proximity signal and transmit a store indicator indicative of a store location to the central order processing system 120. The central order processing system 120 may then route the customer order entry to a local store server 150 at the identified store location. In some implementations the central order processing system 120 may simultaneously prompt the local store server 150 to activate the customer order entry for further processing. In some implementations the step of routing the customer order entry may occur at a first time upon a first detection of the proximity device, whereas the step of activating the customer order entry may occur at a second time upon a second detection of the proximity device. For example, the first detection of the proximity device may occur when the mobile device of the customer is a block away from the identified store location, whereas the second detection of the proximity device may occur when the mobile device of the customer is within 3-4 feet of the proximity device at the identified store location.

While the central order processing system 120 and the central database 130 are shown as two separate devices, in some implementations the central order processing system 120 and the central database 130 may be the same component. Likewise, while the client device 110 and the central database 130 are shown as two separate components of environment 100, in some implementations the client device 110 and the central database 130 may be the same component. For example, in some implementations a user may install an application 115 on the client device 110 that may be configured to store and retrieve customer preferences on the client device 110.

Figure 2:
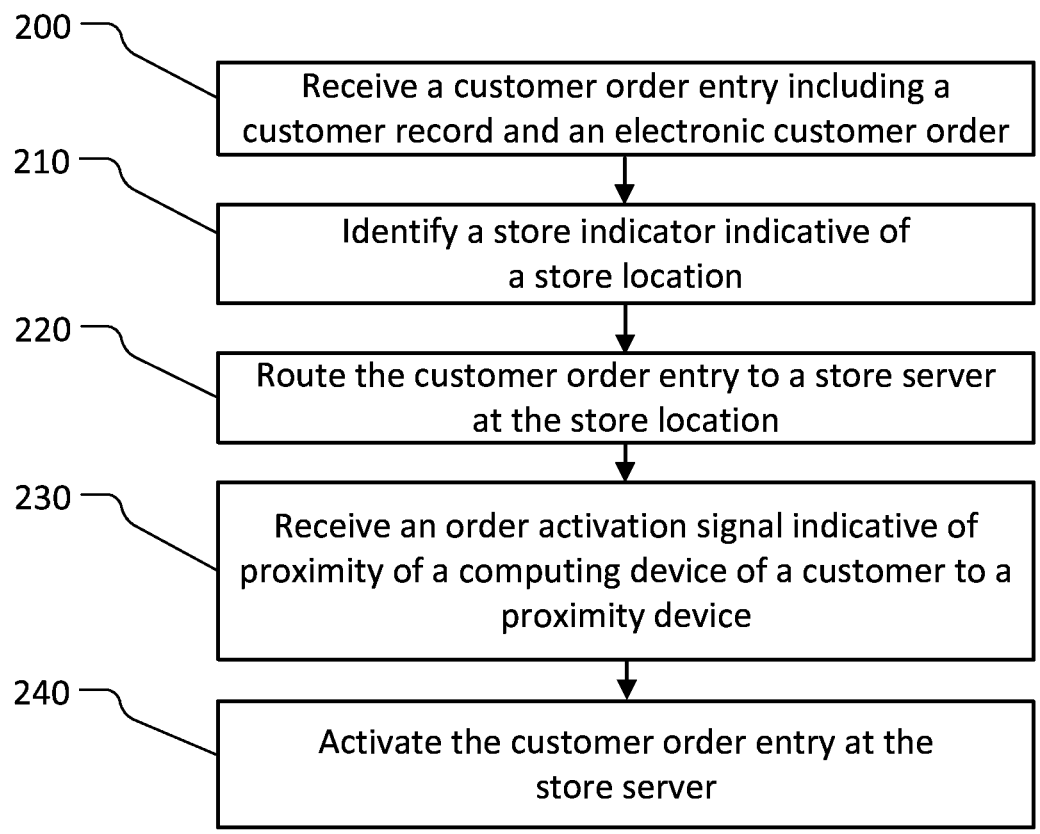
FIG. 2 is a flow chart illustrating an example method, implemented on a central server, of activating a customer order at a store location based upon detection of proximity of the customer to the store location.

FIG. 2 is a flow chart illustrating example method, implemented on a central server, of activating a customer order at a store location based upon detection of proximity of the customer to the store location. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the central order processing system 120, the central database 130, one or more local store servers 150, and/or the client device 110 of FIG. 1.

At step 200, a customer order entry indicative of a customer record and an electronic customer order may be received. The customer order entry may be received at a central server. The customer order entry may include a customer identifier identifying a customer record, and an electronic customer order including a predefined selection of at least one menu option from a plurality of menu options. In some implementations the customer order entry may include payment information, one or more coupons, and so forth. In some implementations the customer order entry may be received by the central order processing system 120. In some implementations the central order processing system 120 may store the customer order entry in a database such as central database 120 and associate the customer order entry with a unique order identifier. For example, the customer order entry may include an electronic customer order such as "<1234; 2, 5, 9>", where "1234" is an order number. The central order processing system 120 may associate the customer order entry with the unique order identifier "1234-2-5-9". As another example, the customer order entry may include a QR code. The central order processing system 120 may associate the customer order entry with the QR code. In some implementations the central order processing system 120 may provide the unique order identifier to the computing device of the customer.

At step 210, a store indicator indicative of a store location may be identified. The store indicator is an indicator associated with a store location. For example, the store indicator may be a store identification number (e.g., Store 1234) associated with a store location. As another example, the store indicator may be a street address for a store location.

In some implementations a list of store locations may be provided to a customer via a computing device. The list of store locations may be provided based on one or more factors, such as customer location, customer's preferred order pick-up location, customer's past preferences for order pick-up, and customer traffic patterns at one or more store locations. In some implementations the list of store locations may be provided via a user interface on the client device 110. In some implementations application 115 on the client device 110 may be configured to display the user interface. In some implementations the user interface may be an interactive display. In some implementations the user interface may be a graphical user interface. In some implementations the store indicator may be identified based on detection of proximity of the computing device of the customer to a proximity device at a store location.

At step 220, the customer order entry may be routed to a store server at the identified store location. In some implementations, when a store indicator is included in the customer order entry, the central order processing system 120 may route the customer order entry to a local store server 150 at the store location indicated by the store indicator at the time the customer order entry is received. In some implementations the store indicator may be identified based on detection of proximity of the computing device of the customer to a proximity device at a store location. In such instances the central order processing system 120 may route the customer order entry to a local store server 150 at the store location indicated by the store indicator, upon detection of proximity of the computing device of the customer to the proximity device at the identified store location. In some implementations the central order processing system 120 may provide the unique order identifier to the local store server 150. For example, the central order processing system 120 may provide the unique order identifier "1234-2-5-9" associated with the customer order entry to the local store server 150. As another example, the central order processing system 120 may provide the QR code associated with the customer order entry to the local store server 150.

At step 230, an order activation signal may be received. The order activation signal is indicative of proximity of the computing device to a proximity device located at the identified store location. For example, the mobile device 110 of the customer may be configured to detect a proximity device placed at a location in the drive-through area of a store location. The proximity device at the store location may emit a proximity signal which may be detected by a background process running on the mobile device. When the mobile device is within a threshold distance of the proximity device, a mobile application 115 may be automatically invoked on the mobile device, and an order activation signal transmitted to the central server, the order activation signal indicating proximity to the store location. Additionally, the order activation signal may identify the customer order entry to the central order processing system 120. For example, the order activation signal may include the unique order identifier "1234-2-5-9" associated with the customer order entry. As another example, the order activation signal may include the QR code associated with the customer order entry.

As discussed herein, in some implementation the proximity device may be a low-energy transmission device. In some implementations the low-energy transmission device may be a single-mode device that transmits a proximity signal without the capability of receiving a signal. As the customer approaches the drive-through area for order pick-up, the mobile device 110 of the customer may detect the proximity signal. In some implementations the mobile device 110 may be configured to receive a proximity signal, identify strength of the proximity signal, and determine the distance from the proximity device. In some implementations the proximity signal may be detected by the mobile device 110 when the customer is a mile away from the proximity device at the identified store location. The customer order entry may not be suitable for activation at such time. As a result the mobile device 110 may not communicate its proximity to the store location to the central order processing system 120. In some implementations the optimal time for customer order activation may be when the customer is within a threshold distance away from the proximity device. In some implementations such threshold distance may be 3-4 feet. In some implementations when the mobile device 110 determines that the proximity device is within the threshold distance, the mobile device 110 may invoke a mobile application 115 on the mobile device 110. The mobile device 110, and/or the mobile application 115 may communicate with the central order processing system 120 by transmitting the order activation signal indicating arrival of the customer at the store location. Accordingly, the central order processing system 120 may receive the order activation signal from the mobile device 110 of the customer. In some implementations the mobile device 110 of the customer may transmit the order activation signal directly to the local store server 150 at the identified store location.

At step 240, the customer order entry may be activated at the store server. The activation may occur over a wire via data transfer from the central order processing system 120 to the local store server 150. The activation may additionally and/or alternatively occur via data transfer from the mobile device of the customer to the local store server 150. Receipt of the order activation signal may be indicative of proximity of the computing device of the customer to the proximity device. For example, when the central order processing system 120 receives the order activation signal from the mobile application 115, the central order processing system 120 may prompt local store server 150 to activate the customer order entry. As another example, the central order processing system 120 may receive the order activation signal including the unique order identifier "1234-2-5-9". The central order processing system 120 may identify the customer order entry associated with the unique order identifier and may prompt the local store server 150 to activate the customer order entry. In some implementations the central order processing system 120 may provide the unique order identifier "1234-2-5-9" to the local store server 150. The local store server 150 may identify the customer order entry associated with the unique order identifier and activate the customer order entry. Such activation may mark the beginning of the critical time interval between customer order activation and customer order delivery.

Figure 3:
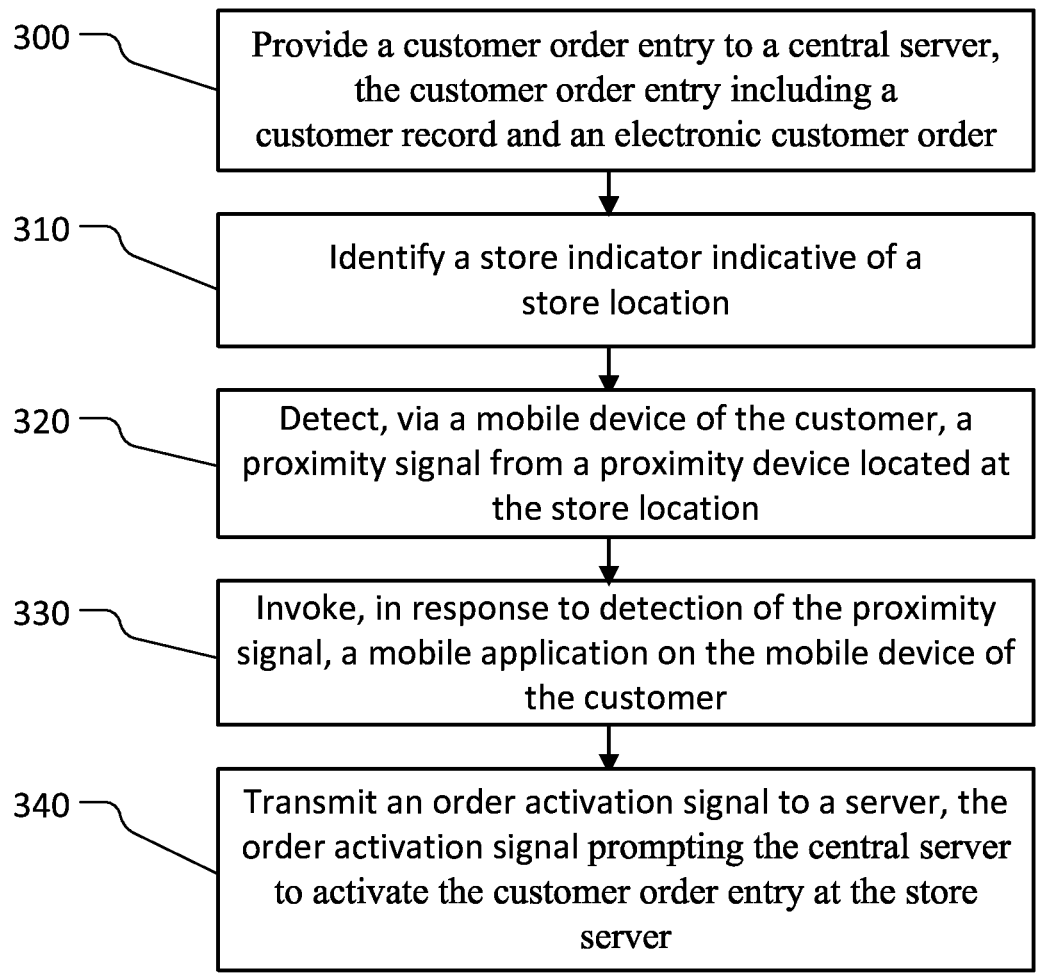
FIG. 3 is a flow chart illustrating an example method, implemented on a mobile device, of activating a customer order at a store location based upon detection of proximity of the customer to the store location.

FIG. 3 is flow chart illustrating an example method, implemented on a mobile device, of activating a customer order at a store location based upon detection of proximity of the customer to the store location. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the central order processing system 120, the central database 130, one or more local store servers 150, and/or the client device 110 of FIG. 1.

At step 300, a customer order entry may be provided to a central server. The customer order entry may include a customer record and an electronic customer order. The electronic customer order may include a selection of at least one menu option from a plurality of menu options. In some implementations the customer order entry may include a store indicator indicating a store location selected by the customer. In some implementations the customer order entry may include payment information for the customer. In some implementations customer order entry may be provided to the central order processing system 120. In some implementations the customer order entry may be associated with a unique order identifier (e.g., order number). In some implementations the unique order identifier may be included in the customer order entry. Step 300 may have one or more aspects in common with step 200 of FIG. 2.

At step 310, a store indicator indicative of a store location may be identified. The store indicator is an indicator associated with a store location. For example, the store indicator may be a store identification number (e.g., Store 1234) associated with a store location. As another example, the store indicator may be a street address for a store location. In some implementations the store indicator may be identified based on detection of proximity of the computing device of the customer to a proximity device at a store location.

In some implementations a list of store locations may be provided to a customer via a computing device (e.g., a web application running on a computing device). The list of store locations may be provided based on one or more factors, such as customer location, customer's preferred order pick-up location, and customer's past preferences for order pick-up. In some implementations the list of store locations may be provided via a user interface on the mobile device 110. In some implementations application 115 on the client device 110 may be configured to display the user interface. In some implementations the user interface may be an interactive display. In some implementations the user interface may be a graphical user interface. A store indicator may be generated based on customer selection of a store from the list of store locations. In some implementations the list of store locations may be provided based on a store indicator. Step 310 may have one or more aspects in common with step 210 of FIG. 2.

At step 320, a mobile device of a customer may detect a proximity signal from the proximity device located at the store location. For example, the proximity device may be a low-energy transmission device that transmits a proximity signal. As the customer approaches the drive-through area for order pick-up, the mobile device 110 of the customer may detect the proximity signal. The proximity signal may be detected by a background process running on the mobile device.

In some implementations the mobile device 110 may be configured to receive a proximity signal, identify strength of the proximity signal, and determine the distance from the proximity device. In some implementations the proximity signal may be detected by the mobile device 110 when the customer is a mile away from the proximity device at the identified store location. However, the customer order may not be suitable for activation at this time. As a result the mobile device 110 may not communicate its proximity to the store location to the central order processing system 120. In some implementations the optimal time for customer order activation may be when the customer is within a threshold distance away from the proximity device. In some implementations such threshold distance may be 3-4 feet.

At step 330, a mobile application 115 on the mobile device may be invoked. For example, when the mobile device 110 determines that the proximity device is within the threshold distance, the mobile device 110 may invoke a mobile application 115 on the mobile device 110. For example, the mobile application 115 may be automatically invoked on the mobile device by one or more background processes running on the mobile device.

At step 340, an order activation signal may be transmitted to a server by the mobile application 115. In some implementations the server may be the central server. In some implementations the server may be the local store server. The mobile device 110, and/or the mobile application 115 may transmit an order activation signal indicating arrival of the customer at the identified store location. Accordingly, the central order processing system 120 and/or local store server 150 may receive the order activation signal from the mobile device 110 of the customer.

The order activation signal may be indicative of proximity of the computing device to a proximity device located at the identified store location. Receipt of the order activation signal is indicative of proximity of the computing device of the customer to the proximity device. Additionally, the order activation signal may identify the customer order entry to the central order processing system 120. For example, the order activation signal may include a unique order identifier (e.g., order number) associated with the customer order entry. Upon receipt of the order activation signal from the mobile application 115, the central order processing system 120 may prompt local store server 150 to activate the customer order entry. For example, the central order processing system 120 may receive the order activation signal including the unique order identifier "1234-2-5-9". The central order processing system 120 may identify the customer order entry associated with the unique order identifier and prompt the local store server 150 to activate the customer order entry. In some implementations the central order processing system 120 may provide the unique order identifier "1234-2-5-9" to the local store server 150. The local store server 150 may identify the customer order entry associated with the unique order identifier and activate the customer order entry. Such activation marks the beginning of the critical time interval between customer order activation and customer order delivery. Step 340 may have one or more aspects in common with steps 230 and/or 240 of FIG. 2.

Figure 4A:
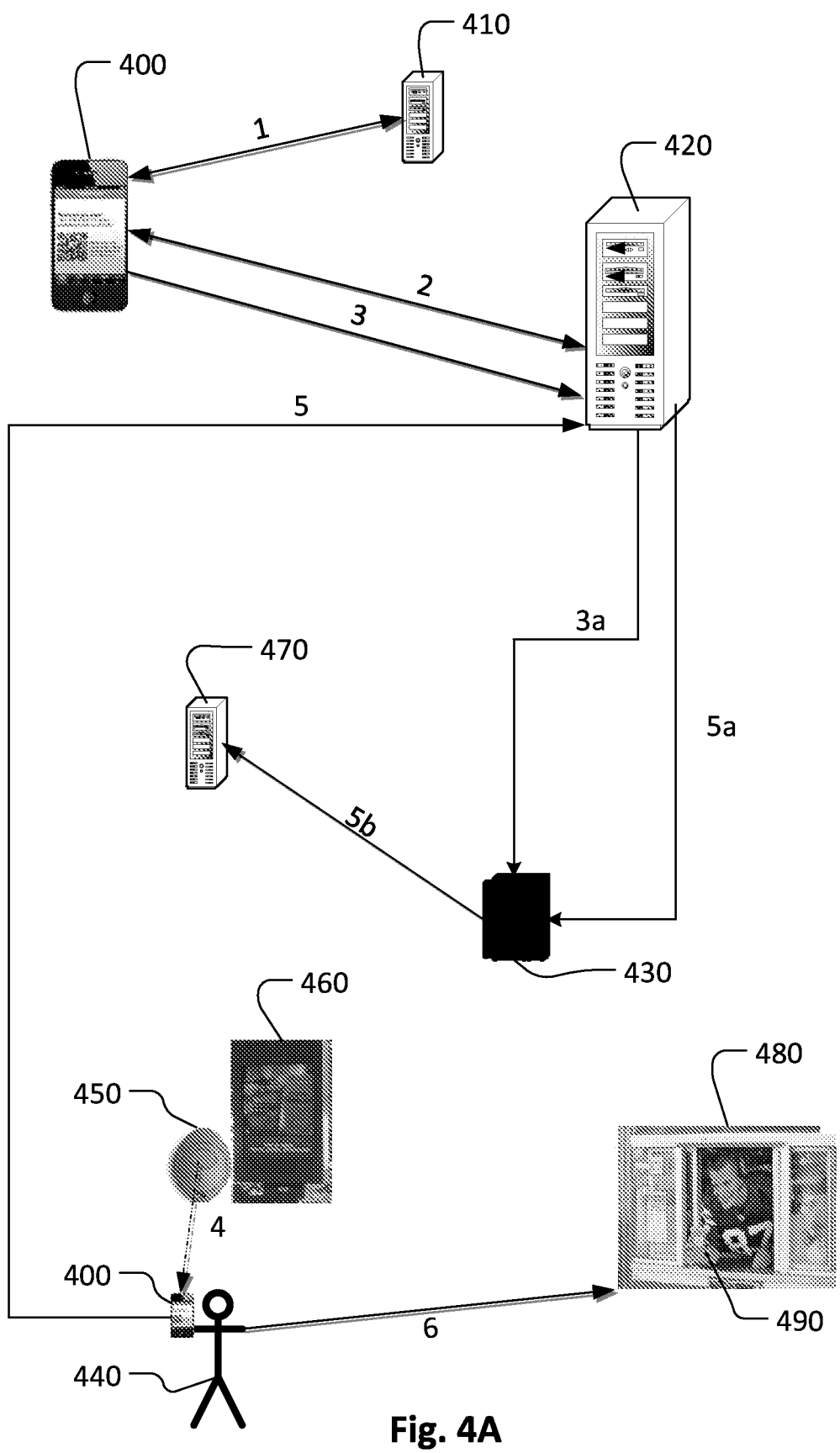
FIG. 4A is a schematic diagram that provides a general overview of an example environment for activating a customer order based upon detection of proximity.

FIG. 4A is a schematic diagram that provides a general overview of an example environment for activating a customer order based upon detection of proximity. The schematic diagram in FIG. 4A illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 4A. For convenience, aspects of FIG. 4A will be described with reference to a system of one or more computers that perform the process. The system may include, for example, the central order processing system 120, the central database 130, one or more local store servers 150, and/or the client device 110 of FIG. 1.

A client device 110 (e.g., mobile device 400) of a customer may be configured to run one or more applications (e.g., a mobile application) to implement a method of activating a customer order based upon detection of proximity.

At step 1, a store location may be retrieved. In some implementations the store location may be retrieved from a map-based service provider 410. The customer may select a store location. In some implementations such selection may be made, for example, by tapping a portion (e.g., portion displaying the desired store location) of a touch-sensitive screen of a mobile device. In some implementations such selection may be made via a voice command delivered to a voice-recognition system on the mobile device 400. The voice recognition system may be configured to be compatible with the user interface on the mobile device 400. Step 1 may have one or more aspects in common with step 210 of FIG. 2 and step 310 of FIG. 3.

At step 2, upon selection of the store location, the mobile device 400 may provide a store indicator to a central order processing system 120 (e.g., central server 420) over a communication network, such as the communication network 140 of FIG. 1. The central server 420 may provide one or more menu options, add-ons and/or prices to the mobile device 400. In some implementations the one or more menu options, add-ons and/or prices may be based on the identified store location. In some implementations the one or more menu options, add-ons and/or prices may be based on the customer (e.g., past menu selections made by the customer). A user interface on the mobile device 400 may present the one or more menu options, add-ons and/or prices to the customer. Step 2 may have one or more aspects in common with step 210 of FIG. 2 and step 310 of FIG. 3.

The customer may make menu selections, and at step 3, the mobile device may provide a customer order entry to the central server 420. In some implementations the customer order entry may include a customer record, an electronic customer order, and optional payment information. In some implementations the customer order entry may include a store indicator indicating a store location. The customer order entry is received by the central server 420. Step 3 may have one or more aspects in common with step 200 of FIG. 2 and step 300 of FIG. 3.

At step 3a, the customer order entry may be routed by the central server 420 to a local store server 150 (e.g., local server 430) at the identified store location. In some implementations the customer order entry may be committed to a deferred order queue at the local server 430. Step 3a may have one or more aspects in common with step 220 of FIG. 2.

At step 4, the mobile device 400 of the customer 440 may detect a proximity signal from a proximity device 450. In some implementations the proximity device 450 may be positioned in the vicinity of a drive-through order selection board 460. The drive-through order selection board 460 may provide menu and pricing options for food and/or other items available at the store location. In some implementations the proximity device 450 of the low energy transmission signal may be positioned in the vicinity of a point of sale. The mobile device 400 of the customer 440 may be configured to detect signal strength of the proximity signal. In some implementations a distance of the mobile device 400 from the proximity device 450 may be determined based on the signal strength. In some implementations the proximity device 450 may be associated with a MAC address. The MAC address may be associated with a unique store location. In some implementations, the association between a MAC address and a store location may be stored in a central database 130.

In some implementations when the mobile device 400 may determine that the proximity device 450 is within a threshold distance (e.g., 3-4 feet) of the mobile device 400, the mobile device 400 may invoke a mobile application on the mobile device 400. The mobile application may be automatically invoked on the mobile device by one or more background processes running on the mobile device. Step 4 may have one or more aspects in common with steps 330 and 340 of FIG. 3.

At step 5, the mobile application may transmit an order activation signal to the central server 420. The mobile device 400, and/or the mobile application invoked on the mobile device, may transmit an order activation signal indicating arrival of the customer at the store location. Accordingly, the central server 420 may receive the order activation signal from the mobile device 400 of the customer.

The order activation signal may be indicative of proximity of the computing device to a proximity device located at the identified store location. Receipt of the order activation signal is indicative of proximity of the computing device of the customer to the proximity device. Step 5 may have one or more aspects in common with step 230 of FIG. 2 and step 340 of FIG. 3.

In response to the order activation signal from the mobile device 400, at step 5a the central server 420 may prompt the local store server 430 to activate the customer order entry. The local store server 430 may remove the customer order entry from the deferred order queue and place it in an active order queue. In some implementations the customer order may be displayed on a monitor in the kitchen, and/or at the point of sale. Step 5a may have one or more aspects in common with step 240 of FIG. 2 and step 340 of FIG. 3.

The customer 440 may enter the drive-through and drive up to a speaker box and/or drive-through order selection board 460. In some implementations the customer may be greeted by an automated voice messaging system, and/or an actual person. For example, the customer may be asked to confirm the customer order. In some implementations such conformation may be completed via the mobile device 400. Upon confirmation of the order, at step 6, the customer may drive up to the drive-through window 480 to pick up the prepared order 490.

In some implementations the payment may be processed at step 5b. Payment may be processed by transmitting the payment information from the local store server 430 to an external financial entity 470. For example, the central server 420 may route a customer order entry to the local store server 430, where the customer order entry includes payment information for the customer order. Upon activation of the customer order entry, and/or upon confirmation of the customer order, the local store server 430 may access an external financial entity 470 to process customer payment. In some implementations such payment processing may be completed automatically with prior customer authorization. For example, the payment information may include a customer's credit card information (e.g., credit card number, statement address, authorization code). The customer may have authorized payment at the time the customer order was submitted. Accordingly, upon activation of the customer order entry, and/or upon confirmation of the customer order, the local store server 430 may provide the customer's credit card information to the external financial entity 470 to process customer payment.

In some implementations, such processing may be implemented to run subsequent to customer authorization at the time of order pick-up. For example, the payment information may include a customer's credit card information (e.g., credit card number, statement address, authorization code). Upon activation of the customer order entry, and/or upon confirmation of the customer order, the local store server 430 may prompt the customer to submit the customer's credit card information to the external financial entity 470 for payment processing. In some implementations the local store server 430 may prompt the customer by providing a selectable menu option on the mobile device, and the customer may submit the optionally stored credit card information by selecting the selectable menu option. In some implementations an attendant may manually confirm submission of the customer's credit card information prior to providing such information to the external financial entity 470. In some implementations the customer's credit card information may not be included in the customer order entry and the customer may choose to pay at the drive-through location via one or more payment methods (e.g., cash, credit card, debit card, coupon).

In some implementations the payment may be processed by transmitting the payment information from the central server 420 to the external financial entity 470. In some implementations payment may be processed by transmitting the payment information from the mobile device 400 to the external financial entity 470. In some implementations payment may be submitted and processed at the drive-through window 480 at the time the order 490 is picked up.

In some implementations payment may be processed at the time the order is placed, at the time the order is activated, at the time the order is confirmed, or after the time the order is picked up.

Figure 4B:
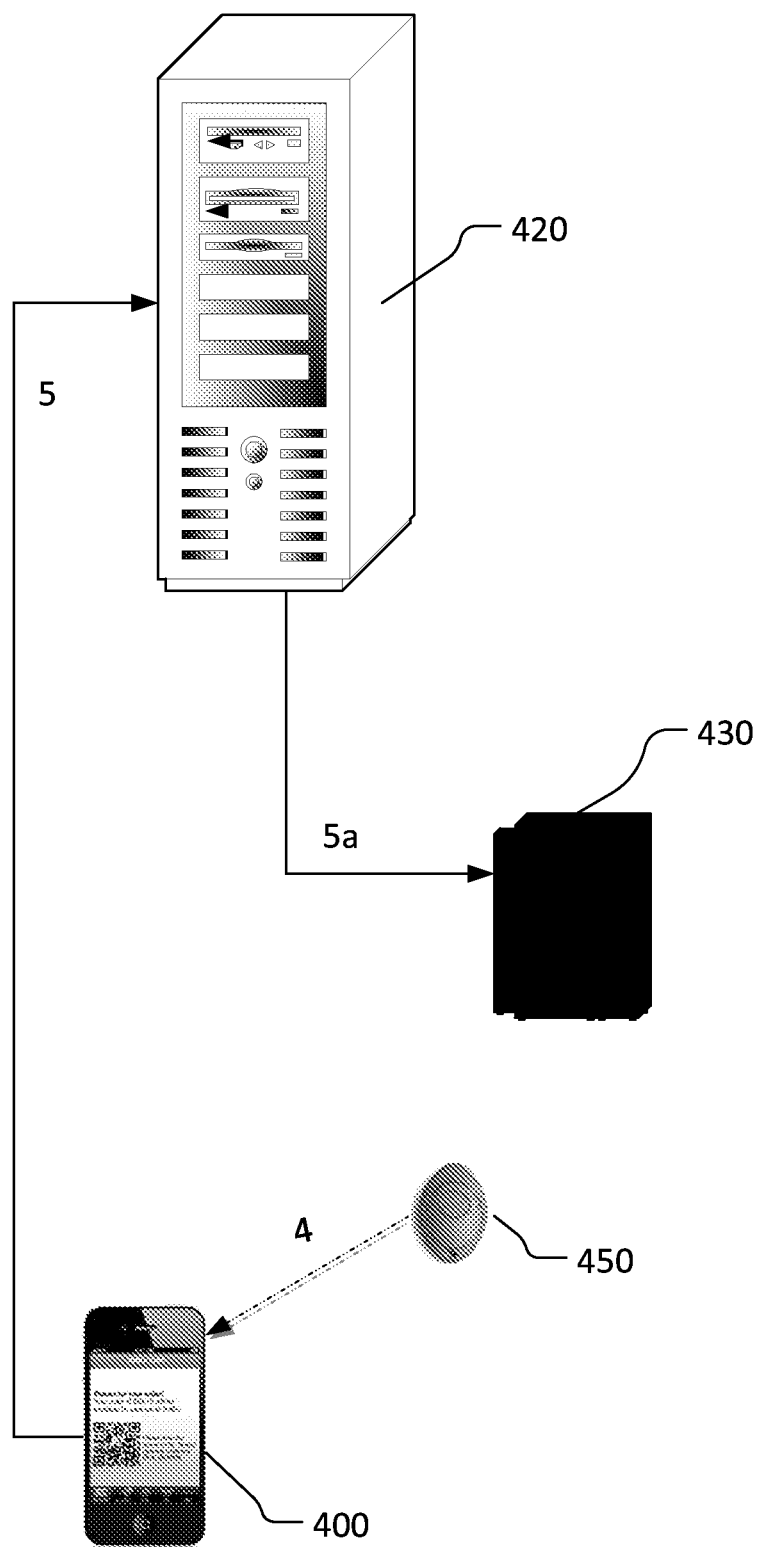
FIG. 4B is a schematic diagram that provides a general overview of particular aspects of an example drive-through environment for activating a customer order based upon detection of proximity.

FIG. 4B is a schematic diagram that provides a general overview of particular aspects of an example drive-through environment for activating a customer order based upon detection of proximity. The methods and apparatus disclosed herein may be particularly useful in providing a hands-free customer delivery solution.

At step 4, the mobile device 400 of the customer 440 detects a proximity signal from a proximity device 450. The mobile device 400 of the customer 440 may be configured to detect signal strength of the proximity signal. In some implementations a distance of the mobile device 400 from the proximity device 450 may be determined based on the signal strength. Step 4 may have one or more aspects in common with steps 330 and 340 of FIG. 3, and step 4 of FIG. 4A.

In some implementations when the mobile device 400 determines that the proximity device 450 is within a threshold distance (e.g., 3-4 feet) of the mobile device 400, the mobile device 400 invokes a mobile application on the mobile device 400. The mobile application may be automatically invoked on the mobile device by one or more background processes running on the mobile device.

At step 5, the mobile device and/or the mobile application running on the mobile device transmits an order activation signal to the central server 420. The mobile device 400, and/or the mobile application invoked on the mobile device 400, may transmit an order activation signal indicating arrival of the customer at the store location. Accordingly, the central server 420 may receive the order activation signal from the mobile device 400 of the customer.

The order activation signal may be indicative of proximity of the computing device to a proximity device located at the identified store location. Receipt of the order activation signal is indicative of proximity of the computing device of the customer to the proximity device. In response to the order activation signal from the mobile device 400, at step 5a the central server 420 prompts the local store server 430 to activate the customer order entry. Step 5 may have one or more aspects in common with step 230 of FIG. 2, step 340 of FIG. 3, and step 5 of FIG. 4A.

As discussed herein, based on the automatic order activation, the customer may not be required to interact with one or more aspects of the ordering and delivery process after the customer order entry is received by the central order processing system 120.

Figure 5:
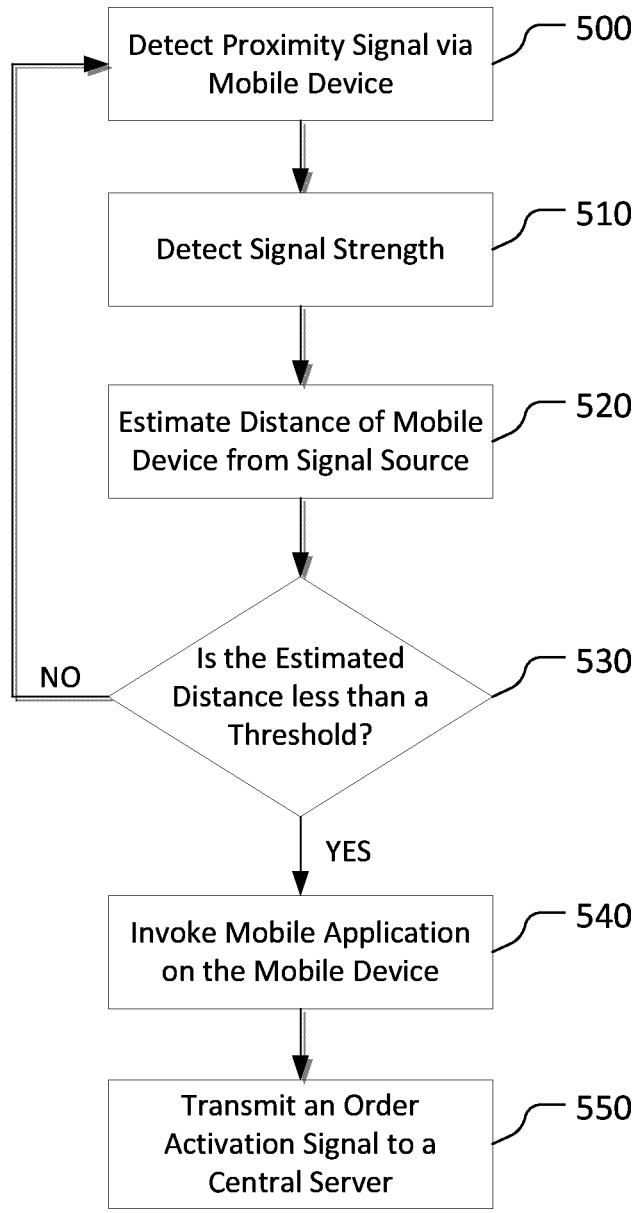
FIG. 5 is a flow chart illustrating an example method, implemented on a mobile device, of invoking a mobile application based upon detection of proximity of the mobile device to a store location.

FIG. 5 is a flow chart illustrating an example method, implemented on a mobile device, of invoking a mobile application based upon detection of proximity of the mobile device to a store location. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the central order processing system 120, the central database 130, one or more local store servers 150, and/or the client device 110 of FIG. 1.

At step 500, a proximity signal emitted by a proximity device may be detected via a mobile device 110. In some implementation the proximity device may be a low-energy transmission device. In some implementations the low-energy transmission device may be a single-mode device that transmits a proximity signal without the capability of receiving a signal. The proximity device may be placed at a location in the drive-through area. For example, an establishment offering customer ordering generally has an order selection board that displays the menu options available to the customer and the proximity device may be placed proximate to the order selection board. In some implementations the proximity device may be placed at or near the order selection board. In some implementations the mobile device 110 may be configured to receive a proximity signal. As the customer approaches the drive-through area for order pick-up, the mobile device 110 of the customer may detect the proximity signal.

At step 510, the signal strength may be detected. Signal strength may be measured utilizing one or more techniques. For example, a received signal strength indicator ("RSSI") is an indication of the power present in a received signal. In some implementations the RSSI may depend on the distance from the source of the signal. For example, the RSSI may be proportional to the distance of the mobile device 110 from the proximity device. As the mobile device 110 of the customer gets closer to the proximity device, the RSSI may increase. Accordingly, the RSSI may be utilized as an indicator of proximity of the computing device of the customer to a store location.

The distance of the mobile device from the signal source may be estimated. For example, one or more background processes in the mobile device 110 may be configured to detect the RSSI. In some implementations a distance look-up table may be generated mapping the RSSI to estimated distance from signal source. Such a distance look-up table may be stored on the mobile device 110 (e.g., as Read-only-Memory) and the distance look-up table may be accessible to the one or more background processes in the mobile device 110 that may be configured to detect the RSSI. The background processes receive the RSSI, access the distance look-up table, and determine the estimated distance of the mobile device 110 from proximity device.

At step 530, a logic module on the mobile device 110 may compare the estimated distance of the mobile device 110 from proximity device to a threshold distance (e.g., 3-4 feet).

If the estimated distance of the mobile device 110 from proximity device is greater than the threshold distance, the process flows backward to step 500.

If the estimated distance of the mobile device 110 from proximity device is less than the threshold distance, the process flows forward to step 540.

At step 540, a mobile application on the mobile device 110 is invoked. In some implementations the mobile device 110 (e.g., via one or more background processes) may invoke a mobile application 115 on the mobile device 110.

At step 550, an order activation signal may be transmitted to a central order processing system 120. The mobile device 110, and/or the mobile application 115 may transmit the order activation signal to the central order processing system 120, the order activation signal indicative of proximity of the computing device of the customer to the proximity device. In some implementations the central order processing system 120 may be configured such that upon receipt of the order activation signal, the central order processing system 120 automatically responds by prompting the local store server 150 to activate the customer order entry.

Figure 6A:
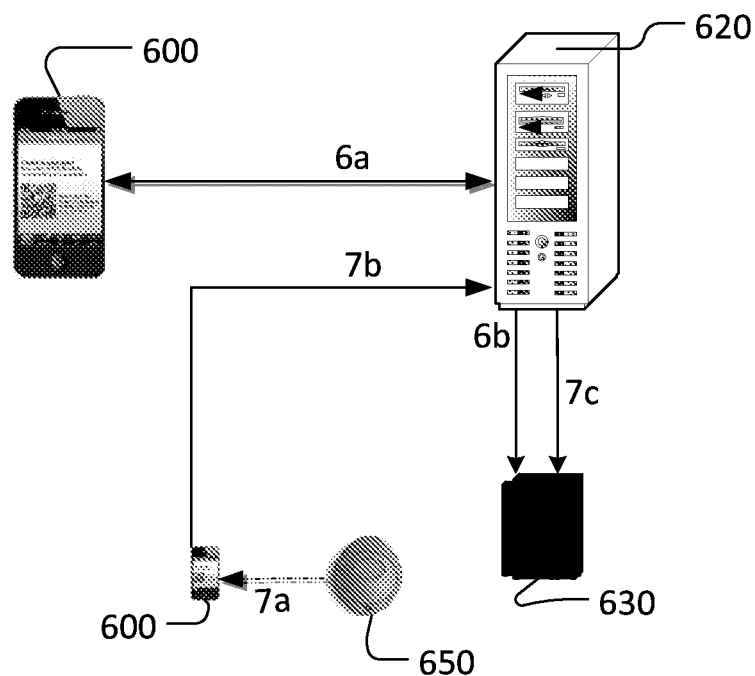
FIG. 6A is a schematic diagram that provides a general overview of an example environment for activating a customer order via a central server.

FIG. 6A is a schematic diagram that provides a general overview of an example environment for activating a customer order via a central server. The schematic diagram in FIG. 6A illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 6A. For convenience, aspects of FIG. 6A will be described with reference to a system of one or more computers that perform the process. The system may include, for example, the central order processing system 120 (e.g., a central server 620), the central database 130, one or more local store servers 150 (e.g., local store server 630), and/or the client device 110 (e.g., mobile device 600 of a customer) of FIG. 1.

At step 6a, computing device 600 of a customer may provide a customer order entry to a central server 620. The customer order entry may include a store indicator. At step 6b, central server 620 may route the customer order entry to a local store server 630 at a store location identified by the store indicator.

At step 7a, a mobile device 600 of the customer may detect a proximity signal from a proximity device 650. A mobile application may be automatically invoked on the mobile device 600. At step 7b, the mobile device 600 may transmit an order activation signal to the central server 620. At step 7c, the central server 620 may activate the customer order entry at the local store server 630 for further processing.

Figure 6B:
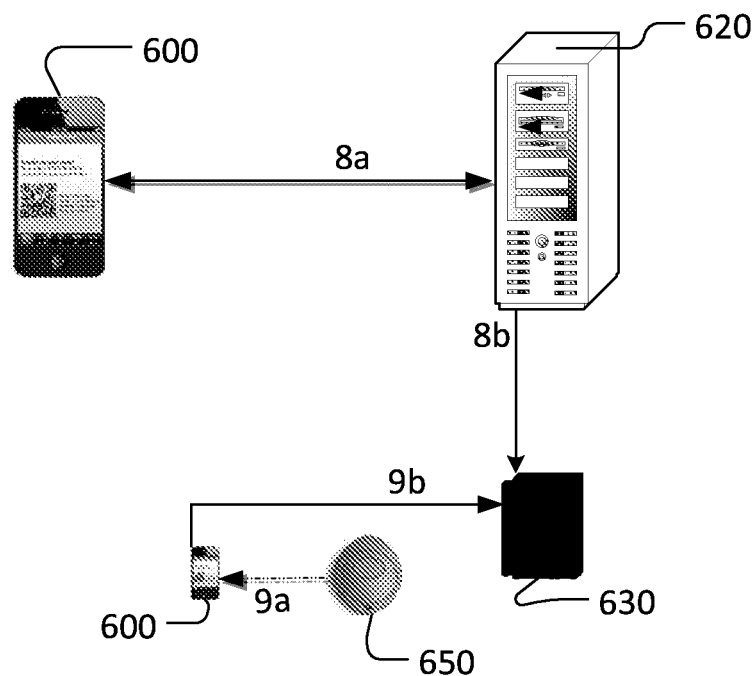
FIG. 6B is a schematic diagram that provides a general overview of an example environment for activating a customer order via a store server.

FIG. 6B is a schematic diagram that provides a general overview of an example environment for activating a customer order via a store server. The schematic diagram in FIG. 6B illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 6B. For convenience, aspects of FIG. 6B will be described with reference to a system of one or more computers that perform the process. The system may include, for example, the central order processing system 120 (e.g., a central server 620), the central database 130, one or more local store servers 150 (e.g., local store server 630), and/or the client device 110 (e.g., mobile device 600 of a customer) of FIG. 1.

At step 8a, computing device 600 of a customer may provide a customer order entry to a central server 620. The customer order entry may include a store indicator. At step 8b, central server 620 may route the customer order entry to a local store server 630 at a store location identified by the store indicator.

At step 9a, a mobile device 600 of the customer may detect a proximity signal from a proximity device 650. A mobile application may be automatically invoked on the mobile device 600. At step 9b, the mobile device 600 may transmit an order activation signal to the store server 630, which may then activate the customer order for further processing.

Figure 6C:
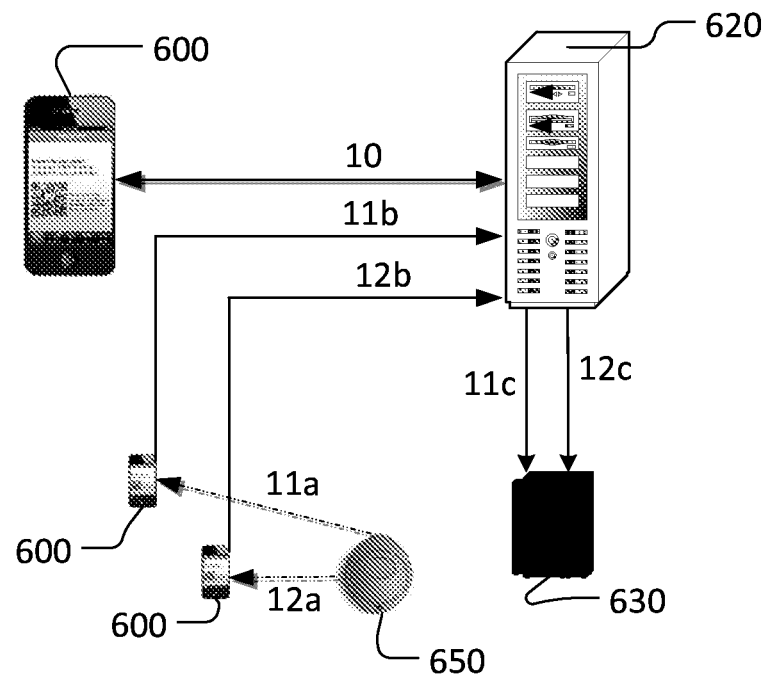
FIG. 6C is a schematic diagram that provides a general overview of another example environment for activating a customer order via a central server.

FIG. 6C is a schematic diagram that provides a general overview of another example environment for activating a customer order via a central server. The schematic diagram in FIG. 6C illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 6C. For convenience, aspects of FIG. 6C will be described with reference to a system of one or more computers that perform the process. The system may include, for example, the central order processing system 120 (e.g., a central server 620), the central database 130, one or more local store servers 150 (e.g., local store server 630), and/or the client device 110 (e.g., mobile device 600 of a customer) of FIG. 1.

At step 10, a computing device 600 of a customer may provide a customer order entry to a central server 620. In some implementations the customer order entry may not include a store indicator.

At step 11a, a mobile device 600 of the customer may detect a first proximity signal from a proximity device 650. In some implementations, based on the one or more techniques discussed herein, the mobile device 600 may identify a store location based on the first proximity signal.

At step 11b, the mobile device 600 may provide a store indicator to the central server 620. At step 11c, central server 620 may route the customer order entry to a local store server 630 at a store location identified by the store indicator.

At step 12a, the mobile device 600 of the customer may detect a second proximity signal from the proximity device 650. In response to such detection, a mobile application may be automatically invoked on the mobile device 600. In some implementations the first and second proximity signals may be identical, and/or steps 11a and 12a may be combined into a single step.

At step 12b, the mobile device 600 may transmit an order activation signal to the central server 620. At step 12c, the central server 620 may activate the customer order entry at the local store server 630 for further processing.

Figure 6D:
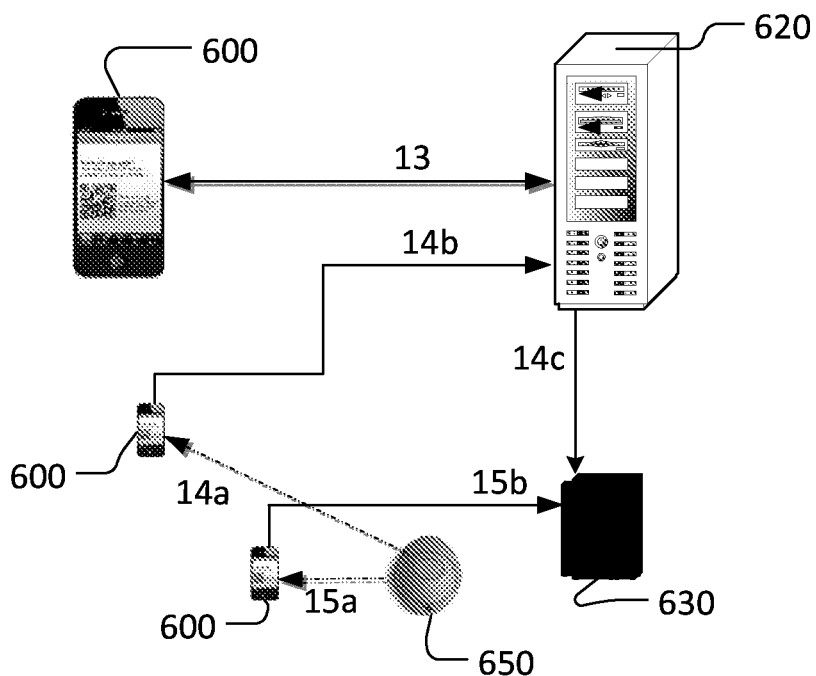
FIG. 6D is a schematic diagram that provides a general overview of another example environment for activating a customer order via a store server.

FIG. 6D is a schematic diagram that provides a general overview of another example environment for activating a customer order via a store server. The schematic diagram in FIG. 6D illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 6D. For convenience, aspects of FIG. 6D will be described with reference to a system of one or more computers that perform the process. The system may include, for example, the central order processing system 120 (e.g., a central server 620), the central database 130, one or more local store servers 150 (e.g., local store server 630), and/or the client device 110 (e.g., mobile device 600 of a customer) of FIG. 1.

At step 13, a computing device 600 of a customer may provide a customer order entry to a central server 620. In some implementations the customer order entry may not include a store indicator.

At step 14a, a mobile device 600 of the customer may detect a first proximity signal from a proximity device 650. In some implementations, based on the one or more techniques discussed herein, the mobile device 600 may identify a store location based on the first proximity signal.

At step 14b, the mobile device 600 may provide a store indicator to the central server 620. At step 14c, central server 620 may route the customer order entry to a local store server 630 at a store location identified by the store indicator.

At step 15a, a mobile device 600 of the customer may detect a second proximity signal from a proximity device 650. In response to such detection, a mobile application may be automatically invoked on the mobile device 600. In some implementations the first and second proximity signals may be identical, and/or steps 14a and 15a may be combined into a single step.

At step 15b, the mobile device 600 may transmit an order activation signal to the store server 630, which may then activate the customer order for further processing.

Figure 7A:
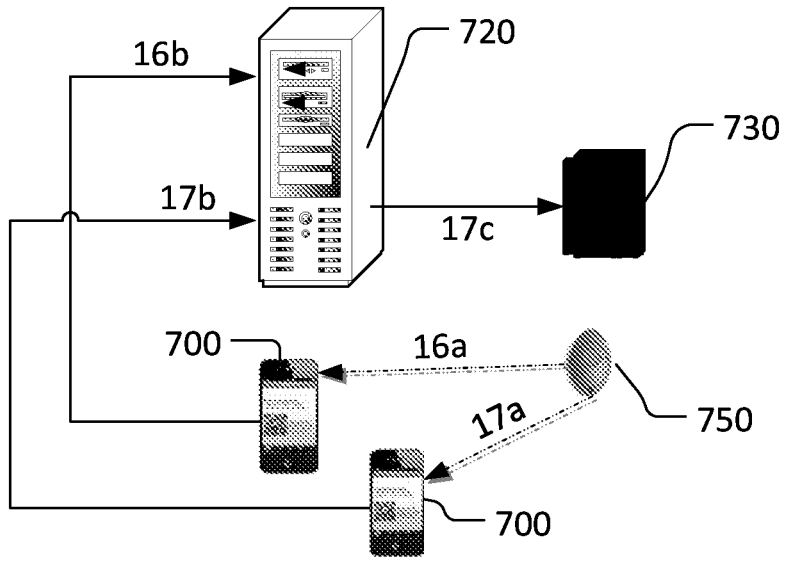
FIG. 7A is a schematic diagram that provides a general overview of an example environment for automatic detection of customer arrival.

FIG. 7A is a schematic diagram that provides a general overview of an example environment for automatic detection of customer arrival. The schematic diagram in FIG. 7A illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 7A. For convenience, aspects of FIG. 7A will be described with reference to a system of one or more computers that perform the process. The system may include, for example, the central order processing system 120 (e.g., a central server 720), the central database 130, one or more local store servers 150 (e.g., local store server 730), and/or the client device 110 (e.g., mobile device 700 of a customer) of FIG. 1.

At step 16a, the mobile device 700 of the customer may detect a first proximity signal from a proximity device 750. In some implementations, at step 16b, the mobile device 700 may transmit data related to its proximity to the central server 720. For example, the mobile device 700 may transmit data indicating that it is 10 feet away from an order selection board.

At step 17a, the mobile device 700 of the customer may detect a second proximity signal from the proximity device 750. In response to such detection, an application 115 (e.g., a mobile application) may be automatically invoked on the mobile device 700. At step 17b, the mobile device 700 may transmit an order activation signal to the central server 720. At step 17c, the central server 720 may activate the customer order entry at the local store server 730 for further processing.

In some implementations the central server 720 may be eliminated from the environment for the purposes of activating the customer order entry. As discussed herein with reference to FIGS. 6B and 6D, the order activation signal may be transmitted directly to the local store server 630, as in step 9b of FIG. 6B and in step 15b of FIG. 6D. Likewise, in steps 16b and 17b, the mobile device 700 may communicate directly with the local store server 730 instead of the central server 720.

Figure 7B:
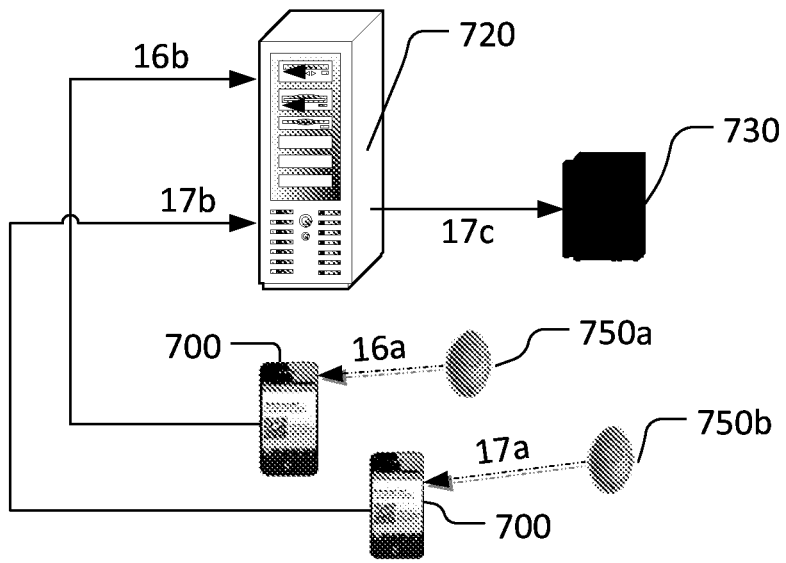
FIG. 7B is a schematic diagram that provides a general overview of another example environment for automatic detection of customer arrival.

FIG. 7B is a schematic diagram that provides a general overview of another example environment for automatic detection of customer arrival. The schematic diagram in FIG. 7B illustrates how a central server and a mobile device may complement one another to implement one or more aspects of the methods and apparatus disclosed herein. Other implementations may perform the steps in a different order, omit certain steps, and/or perform different and/or additional steps than those illustrated in FIG. 7B. For convenience, aspects of FIG. 7B will be described with reference to a system of one or more computers that perform the process. The system may include, for example, the central order processing system 120 (e.g., a central server 720), the central database 130, one or more local store servers 150

(e.g., local store server 730), and/or the client device 110 (e.g., mobile device 700 of a customer) of FIG. 1.

In some implementations a plurality of proximity devices may be located at a store location. The plurality of proximity devices may be located, for example, to identify customer movement in a drive-through area. For example, a first proximity device may be located at the entrance to the drive-through area, a second proximity device may be located at a predetermined distance from an order selection board, and a third proximity device may be located near the order selection board. One or more background processes in the mobile device may be configured to detect the respective proximity signals transmitted by the plurality of proximity devices. In some implementations the mobile device may provide location information associated with each of the plurality of proximity devices to the central order processing system 120. For example, based on the store location, the central order processing system 120 may look up a proximity device table in a database such as central database 130. The proximity device table may include data associating a store location to the plurality of proximity devices. The proximity device table may further associate each of the plurality of proximity devices with a distance from the order selection board.

For example, upon receipt of the first proximity signal from the first proximate device (e.g., located at the entrance to the drive-through area), the central order processing system 120 may access central database 130, and based on the proximity device table, may identify that the mobile device of the customer is at the entrance to the drive-through area. Upon receipt of the second proximity signal from the second proximate device (e.g., located at 10 feet away from an order selection board), the central order processing system 120 may access central database 130, and based on the proximity device table, may identify that the mobile device of the customer is in the vicinity of 10 feet from the order selection board in the drive-through area. Upon receipt of the third proximity signal from the third proximate device (e.g., located at the order selection board), the central order processing system 120 may access central database 130, and based on the proximity device table, may identify that the mobile device of the customer is in the vicinity (e.g., within 3 feet) of the order selection board in the drive-through area. Based at least in part on such information the customer order entry may be activated upon receipt of the third proximity signal from the mobile device of the customer.

At step 16*a*, a mobile device 700 of the customer may detect a first proximity signal from a first proximity device 750*a*. In some implementations, at step 16*b*, the mobile device 700 may transmit data related to its proximity to a central server 720. For example, the mobile device 700 may transmit data indicating that it is 10 feet away from an order selection board in the drive-through area of the store location. In some implementations a mobile application may be automatically invoked in response to detection of the first proximity signal from the first proximity device 750*a*.

At step 17*a*, the mobile device 700 of the customer may detect a second proximity signal from a second proximity device 750*b*. In some implementations the mobile application may not be automatically invoked in response to detection of the first proximity signal from the first proximity device 750*a*. Instead, the mobile application may be automatically invoked in response to detection of the second proximity signal from the second proximity device 750*b*. At step 17*b*, the mobile device 700 may transmit an order activation signal to the central server 720. At step 17*c*, the central server 720 may activate the customer order entry at the local store server 730 for further processing.

Figure 8:
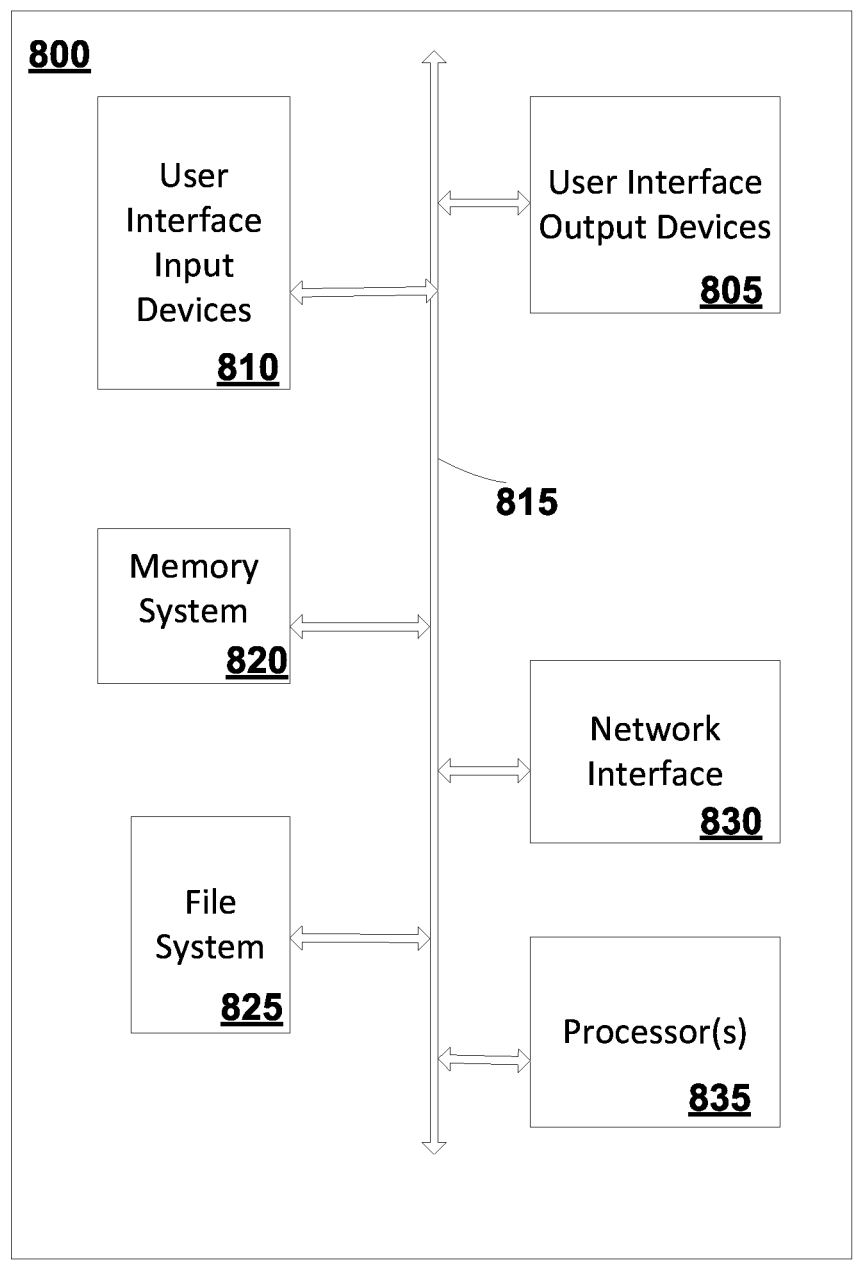
FIG. 8 is a block diagram of an example computer system.

FIG. 8 is a block diagram of an example computer system. Computer system 800 may include one or more processors 835 which may communicate with a number of peripheral devices via bus subsystem 815. Peripheral devices may include, for example, a memory system 820 and a file system 825, user interface input devices 810, user interface output devices 805, and a network interface system 830. The input and output devices allow user interaction with computer system 800. Network interface system 830 provides an interface to outside networks and may be coupled to corresponding interface devices in other computer systems.

User interface input devices 810 may include devices such as a keyboard, a mouse, and a touchscreen. User interface input devices 810 may also include audio input devices, and/or other types of input devices including mobile devices such as client device 160. User interface output devices 805 may include devices such as a display (e.g., on a computing device 160), a printer, and a fax machine. User input devices 810 may also include, for example, a touch-sensitive screen on a mobile device 110 to receive customer selections related to location and/or menu options.

Memory system 820 may include a number of conventional memory systems including a main random access memory (RAM) for storage of instructions and data during program execution and a read only memory (ROM) in which fixed instructions are stored. File system 825 may provide persistent storage for program and data files, and may include a hard disk drive, and/or an optical drive. Other conventional file storage systems may be used. The memory system 820 and the file system 825 may include the logic to determine the subrogation score, and/or generate a subrogation report. Also, for example, the memory system 820 and the file system 825 may include the logic to implement the processes disclosed in steps 200-260, steps 400-460, and/or the steps disclosed in the description of FIG. 3. These software modules are generally executed by processor 835 alone or in combination with other processors.

Bus subsystem 815 provides a mechanism for letting the various components and subsystems of computer system 800 communicate with each other as intended.

Computer system 800 may be of varying types including a workstation, server, or any other data processing system or computing device, including a mobile device. The description of computer system 800 depicted in FIG. 8 is intended only as a specific example for purposes of illustrating some implementations, and represents one of several possible configurations.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is understood that these examples are intended in an illustrative rather than in a limiting sense. Computer-assisted processing is implicated in the described embodiments. It is contemplated that modifications and combinations will readily occur, which modifications and combinations will be within the scope of the following claims.

What is claimed is:

1. A computer implemented method, comprising:
executing software instructions in a mobile device application, the software instructions including steps of:
receiving a customer order entry, the customer order entry including:
a customer identifier identifying a customer record;
an electronic customer order including a predefined selection of at least one menu option from a plurality of menu options;
a store indicator indicative of a store location;
providing the customer order entry to a central server;
detecting a proximity signal from a proximity device located at a proximity device store location, the proximity signal including an identifier for the proximity device store location;
invoking, in response to detection of the proximity signal, the mobile device application; and
transmitting an order activation signal to the central server, the order activation signal indicative of proximity of a mobile device executing the software instructions to the proximity device located at the proximity device store location and including the identifier for the proximity device store location;
wherein the transmitting the order activation signal to the central server is completed without determining a geographic location of the mobile device on which the software instructions are executed;
receiving by the central server the order activation signal;
verifying by the central server that the identifier for the proximity device store location matches the store indicator indicative of the store location of the customer order entry;
activating by the central server the customer order entry at the proximity device store location.

2. The method of claim 1 wherein the software instructions of the mobile device application includes determination of distance of the mobile device on which the software instructions are executed to the proximity device.

3. The method of claim 2 wherein transmitting the order activation signal to the central server occurs when the determined distance is within a threshold distance of the proximity device.

4. The method of claim 1 wherein the proximity device is proximate to an order selection board at the store location.

5. The method of claim 1 wherein the proximity device is a low energy transmission device.

6. The method of claim 1 wherein the identifier for the proximity device store location is at least one of: an identifier of the proximity device; a physical store location identifier; or location coordinates.

7. The method of claim 1 wherein the activating by the central server the customer order entry is at least in part based on customer demand at the proximity device store location.

8. The method of claim 1 wherein the activating by the central server the customer order entry is at least in part based signal strength of the proximity signal.

9. The method of claim 1 wherein the customer order entry includes the store indicator which is different than the proximity device store location.

10. The method of claim 9, wherein when the customer order entry includes the store indicator which is different than the proximity device store location, the central server modifies the customer order entry to include the proximity device store location.

11. The method of claim 1 wherein the plurality of menu options are based on the store indicator.

12. The method of claim 1 wherein the software instructions in the mobile device application further include:
presenting a confirmation request upon detecting the proximity signal;
receiving confirmation of the customer order entry;
transmitting the order activation signal after receiving the confirmation.

13. The method of claim 12 wherein the confirmation request includes presentation of a pop-up window of the customer order entry on the mobile device on which the software instructions are executing.

14. The method of claim 12 wherein the confirmation request includes an audio confirmation of the customer order entry.

15. The method of claim 1 wherein the detecting the proximity signal is completed without determining the geographic location of the mobile device on which the software instructions are executed uses a received signal strength indicator to determine a distance between the mobile device and the proximity device.

16. The method of claim 15 wherein the distance is determined using a distance look-up table based on the received signal strength indicator.

17. The method of claim 15 wherein determining the distance includes:
detecting the received signal strength indicator;
accessing a distance look-up table;
associating the received signal strength indicator to a corresponding estimated distance;
determining the estimated distance of the mobile device from the proximity device.

18. The method of claim 1 wherein the activating by the central server the customer order entry at the proximity device store location includes activating the customer order entry at a local store server.

19. The method of claim 18 wherein the activating by the central server the customer order entry at the proximity device store location includes activating the customer order entry at the central server.

20. The method of claim 1 wherein the central server is a local store server.

21. The method of claim 1 wherein the proximity device is a low energy beacon.

22. The method of claim 21 wherein the low energy beacon is one of a single mode or dual mode beacon.

* * * * *